United States Patent
Grange et al.

(10) Patent No.: US 8,759,074 B2
(45) Date of Patent: Jun. 24, 2014

(54) DEVICE FOR APPLYING ELECTROMAGNETIC ENERGY TO A REACTIVE MEDIUM

(75) Inventors: Andre Grange, Lachassagne (FR); Jean-Marie Jacomino, Rilleuz-la Pape (FR); Adrien Grandemenge, Saint-Didier au Mont d'Or (FR)

(73) Assignee: Sairem Societe pour l'Application Industrielle de la Recherche en Electronique et Micro Ondes (FR)

( * ) Notice: Subject to any disclaimer, the term of this patent is extended or adjusted under 35 U.S.C. 154(b) by 550 days.

(21) Appl. No.: 12/933,017

(22) PCT Filed: Mar. 19, 2009

(86) PCT No.: PCT/FR2009/050457
§ 371 (c)(1),
(2), (4) Date: Jan. 17, 2011

(87) PCT Pub. No.: WO2009/122101
PCT Pub. Date: Oct. 8, 2009

(65) Prior Publication Data
US 2011/0104793 A1  May 5, 2011

(30) Foreign Application Priority Data

Mar. 20, 2008 (FR) ..................................... 08 01541

(51) Int. Cl.
*C12M 1/00* (2006.01)
*B01J 19/08* (2006.01)
*B01D 53/32* (2006.01)
*B01J 19/00* (2006.01)

(52) U.S. Cl.
CPC ............. *B01J 19/087* (2013.01); *B01D 53/323* (2013.01); *B01J 19/0046* (2013.01); *B01J 2219/00596* (2013.01); *B01J 2219/00659* (2013.01)
USPC .................... 435/283.1; 422/186.01; 422/105; 422/186

(58) Field of Classification Search
CPC ...... C12M 27/02; C12M 35/04; C12M 21/04; C12M 23/14; C12M 29/10; A61L 2/24; A61L 2/07; Y02E 60/50; B01J 3/04; B01J 19/087; B01J 2219/0852; F01N 3/2053; C10G 15/00; F02M 27/046; B01D 53/323
USPC ................... 435/283.1; 422/105, 186, 186.01
See application file for complete search history.

(56) References Cited

U.S. PATENT DOCUMENTS 5,344,435 A * 9/1994 Turner et al. .................. 607/101
2006/0011563 A1   1/2006 Meikrantz

FOREIGN PATENT DOCUMENTS

| DE | 102004057851 | 6/2006 |
|---|---|---|
| EP | 0329338 | 8/1989 |
| EP | 1575701 | 9/2005 |
| WO | 0015008 | 3/2000 |
| WO | 2006067579 | 6/2006 |

OTHER PUBLICATIONS
International Search Report; PCT/FR2009/050457; Sep. 21, 2009.

* cited by examiner

*Primary Examiner* — Michael Hobbs
(74) *Attorney, Agent, or Firm* — Cantor Colburn LLP

(57) ABSTRACT

The invention relates to a device (7) for applying electromagnetic energy to a reactive medium, with said device being designed to be connected to an electromagnetic radiation generator using a means of transmission (4) of said radiation, with the device being remarkable in that it includes at least one loss transmission line (70) that features an interface that transfers electromagnetic energy towards the reactive medium, with said transfer interface being arranged so as to assure, throughout the length of the said line, a pre-determined distribution cross-section for the density of the electromagnetic energy delivered to said medium by said line. The invention also relates to a device for processing, by electromagnetic radiation, of a reactive medium including such an application device. The present invention can be applied to the sector of devices for thermal treatment of a reactive medium, specifically by microwave or high-frequency radiation.

15 Claims, 21 Drawing Sheets

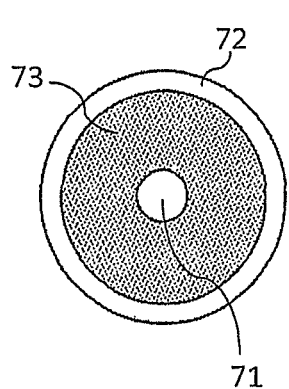
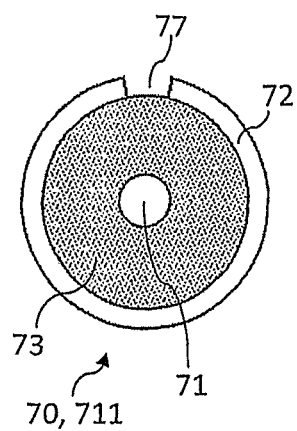
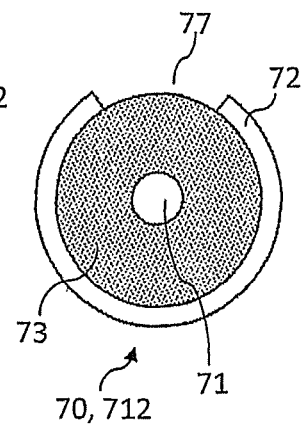
FIG.7a    FIG.8a    FIG.8b
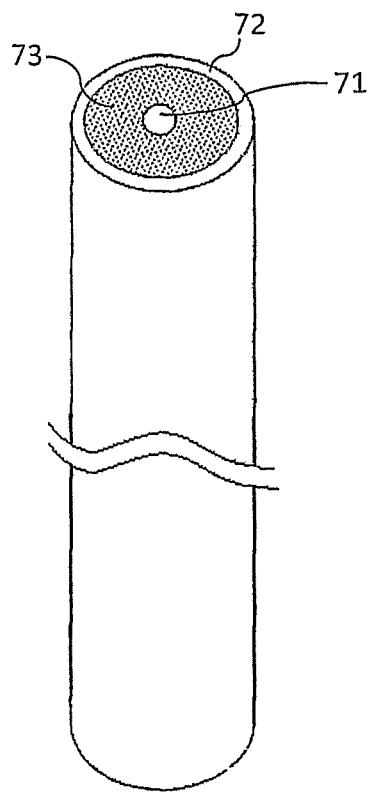
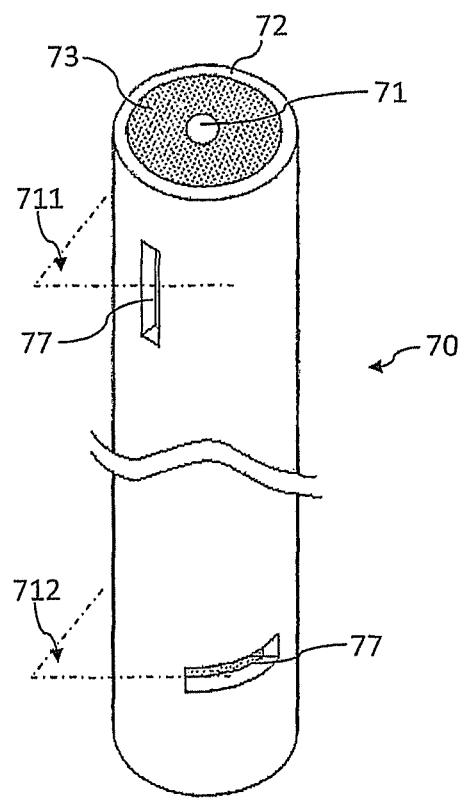
FIG.7b    FIG.8c

DEVICE FOR APPLYING ELECTROMAGNETIC ENERGY TO A REACTIVE MEDIUM

TECHNICAL FIELD

The invention relates to a device for applying electromagnetic energy to a reactive medium, said device being intended to be coupled with an electromagnetic radiation generator via means for transmitting said radiation.

It also relates to an assembly comprising such an application device and a reactor in which the reactive medium is positioned. The invention also relates to a device for treating by electromagnetic radiation a reactive medium, comprising such an assembly.

BACKGROUND

These treatment devices are notably known as a device for heat treatment of a reactive medium, where by <<Meat treatment>> are meant various treatments carried out by heating such as evaporation, drying, roasting, extraction of natural products in suspension in a solvent, reaction or chemical synthesis with heating by dielectric losses (with view of analyzing or producing chemical compounds), dehydration, baking, discoloration, dissociation, polymerization, cross-linking, treatments with supercritical fluids, removal of volatile compounds, etc., as well as various treatments performed simultaneously with heating, such as mixing or milling.

For such heat treatments, it is notably known how to use electromagnetic radiations of the microwave or high frequency type. Microwave electromagnetic radiation relates to waves, the frequency of which is comprised between about 300 MHz and about 30 GHz, preferentially between 400 MHz and 10 GHz, and preferentially between 915 MHz and 2.45 GHz. High frequency electromagnetic radiation relates to waves, the frequency of which is comprised between about 100 kHz and about 300 MHz, preferentially between 13 MHz and 28 GHz.

Such treatment devices find applications for many types of reactive media, which involve a single reagent or a mixture of reagents in variable proportions, in the solid, liquid or gas state, with or without catalysts, said medium comprising at least one component sensitive to radiation. The reactive medium may be of the solid type (for example of granular or powdery type), of the gas, plasma, liquid type (with a solvent and/or solutes absorbing electromagnetic radiation).

In a known way, a device for treating a reactive medium with electromagnetic radiation comprises:
  an electromagnetic radiation generator like a high frequency wave generator or a microwave generator for example in a non-limiting way consisting of a magnetron generator or a semiconductor generator;
  a reactor containing said reactive medium, wherein the reactor may assume the shape of a reservoir with optionally means for circulating said reactive medium; and
  a device for transmitting the electromagnetic radiation generated by the generator to the reactive medium contained in said reactor.

This transmission device conventionally comprises:
  means for transmitting electromagnetic radiation positioned at the output of the generator and coupled with said reactor in order to transmit the electromagnetic energy to the reactor, these transmission means being of course adapted to electromagnetic radiation and which may for example consist of a transmission cable, such as a coaxial cable, or a wave guide conventionally used in the field of microwaves;
  coupling means arranged for allowing transfer into the reactive medium of the electromagnetic energy from the transmission means.

When operating, the generator generates electromagnetic radiation at a given frequency, the transmission device transmits the generated electromagnetic radiation to the reactive medium via the transmission means and the coupling means.

The coupling means generally comprise a device for applying the energy to the reactive medium, currently called an energy applicator, the selection of which depends on the radiation means (high frequencies and microwaves), on dimensional characteristics of the medium to be treated and on its treatment method.

For high frequency applicators, the following applicators are notably known:
  capacitive applicators formed with two capacitor plates between which the high frequency voltage is applied;
  inductive applicators for treating sufficiently conductive materials, these applicators consist of a solenoid energized with a high frequency current;
  applicators with alternating bars for relatively planar materials consisting of tubular or bar electrodes;
  applicators with alternating rings or loops for thread-like materials forming the electrodes.

The major drawback of these applicators is that they are not very or not adapted for ensuring energy transfer in a liquid mass and homogeneously.

For microwave applicators, the following applicators are notably known:
  applicators with a localized field of the single-mode cavity type;
  applicators with a diffuse field of the multi-mode cavity type;
  applicators with a near field of the radiating antenna guide type.

As regards applicators with a localized field or with a diffuse field, they require a reactor at least partly consisting of a material transparent to the waves, i.e. not absorbing the waves, such as for example polytetrafluoroethylene or quartz, which is positioned inside the cavity of the applicator. The reactor containing the reactive medium is then subject to electromagnetic radiation coming from the outside.

The applicator with a localized field, of the single-mode type, is formed with a single-mode cavity of predetermined size, resonating at the emission frequency according to radiation in the direction of the waveguide. This single-mode cavity allows a relatively homogeneous distribution of the electromagnetic field inside the cavity. Nevertheless, with this type of single-mode applicator, the amount of material to be treated is limited by the dimensions of the cavity and therefore of the waveguide. For an industrial application, it is necessary to provide a complex and costly apparatus comprising several single-mode applicators placed in parallel in order to have sufficient output, as well as a complex circulation system for the reactive medium. Further, the transferable electromagnetic energy is limited by the volume at the interface between the product to be treated and the radiation.

The applicator with a diffuse field, of the multi-mode type, on the other hand provides a non-homogeneous distribution of the electromagnetic field inside the cavity, with the presence of hot points. Such a distribution limits the volume of the sample to be treated in the applicators of the multi-mode type, and furthermore requires setting into motion or stirring of the sample in order to ensure homogeneity of the heating by microwaves.

A common drawback to both of these applicators of the single-mode type or multi-mode type is that they require reactors in a suitable material in order not to absorb the waves. In addition to being particularly complex and costly to produce, these reactors transparent to the waves are limited in size and in shape, thereby limiting the treatment by waves to certain reactions and certain reactive media, and excluding other reactions where the shape and the length of the reactor may have a predominant role. It is also noted that for reactions which have to be conducted under high pressure, independently or not of the heating induced by the electromagnetic radiation, these wave-transparent reactors most often withstand high pressures with difficulty.

The other drawbacks common to both of these applicators, of the single-mode or multi-mode type, result from the difficulty of obtaining a constant electric field in the reactor, and finally from the fact that the geometry of the cavity depends on the radiation frequency so that an applicator with a localized field can only operate at a given single frequency.

A last drawback of both of these applicators, of the single-mode or multi-mode type, is that they are not compatible with a device for accurately controlling the heating temperature of the reactive medium by the use of an outer coolant fluid. Indeed, in order to accurately and optimally control a reaction, it is particularly advantageous that a liquid coolant circulates around the reactor in the heating area. If this was the case, the waves would heat the liquid coolant, which clearly cannot be considered. If the liquid coolant circulated in a conduit non-transparent to the waves, the conduit would in this case form a screen between the electromagnetic radiation and the reactor, clearly limiting the exposure of the reactive medium to the radiation and therefore the yield of the heating. These applicators therefore prevent temperature control in the irradiation area, i.e. in the cavity, so that control of temperature is sometimes inefficient or even incompatible with certain chemical reactions. This is notably the case when it is necessary to maintain a low temperature during the treatment of materials of biological origins which may thermally degrade after irradiation with electromagnetic waves.

As regards the applicators with a near field of the radiating antenna guide type, they are known from the prior art notably from European patent application No. EP 0 329 338 which discloses a device for treating by microwaves ceramic powders in a high pressure environment. This device includes a reactor forming a high pressure resonant cavity, in the interior of which microwave radiation is introduced by a rectilinear antenna which partly extends into the cavity.

An applicator with a near field is also described in document DE 10 2004 057 851 A1, wherein a rectilinear antenna of the straight antenna or stick antenna type, is directly introduced into the interior of a reactor, containing a gas, liquid or solid medium. A coaxial cable, comprising an internal conductor and an external conductor, is coupled with the reactor in the following way: the external conductor is coupled with the external wall of the reactor and the internal conductor opens out into the reactor at the coaxial cable/reactor junction. The end portion of the internal conductor thus forms an antenna which radiates into the reactive medium which heats up by dielectric loss. The length of the antenna is greater than the wavelength of the radiation.

International application WO 00/15008 describes an applicator with a near field having a radiating antenna. This device comprises a cable, one first end of which is connected to a receiver for receiving the waves generated by a wave generator, and one second end of which cooperates with a transmitter for transmitting the waves into the reactor. The cable may be of the coaxial type and the transmitter corresponds to an exposed portion of an internal conductor of said coaxial cable. This exposed portion of the internal conductor has a length of about one quarter of the radiation wavelength, and it plays the role of a radiating rectilinear antenna inside the reactor.

International application WO 2006/067579 describes an applicator with a near field similar to the one described in international application WO 00/15008, with a radiating antenna. This antenna at its free end has one or more exposed portions of an internal conductor which radiates inside a reactor, the effect of the radiation is thus focused on the end of the antenna. In order to avoid the effects of too localized radiation and to densify the distribution of the energy, in this document, the use of two or more antennas which emit waves in phase according to the principle of interference of coherent electromagnetic waves is contemplated. The application of this principle involves the use of expensive techniques, with several antennas coupled with the wave generator and with a device for controlling the in-phase energizing of the antennas from a same wave generator.

Patent application US 2006/001563 A1 describes a device used in separating a mixture, such as for example a liquid mixture or a colloidal suspension, wherein the device comprises a rotor assembly interiorly divided into one or more chambers. This document discloses the principle of using at least one microwave generator for transmitting microwave energy into the chamber(s). In a first configuration, the microwave generators are positioned inside an internal tubular shaft extending inside the rotor assembly wherein at least one portion of the internal tubular shaft is substantially transparent to microwave energy. This document does not detail the structure of the microwave generator and further does not give any teaching for one skilled in the art on the application of these microwave-generating means within this separation device, except for a vague indication on the use of an antenna without any further specification as to the selection and use of such an antenna. In a second configuration, the microwave generator(s) comprise(s) one or more wave guides formed inside the internal tubular shaft in order to emit microwave radiation into the chamber(s) through transparent portions of said shaft; the use of such wave guides not operating for generating microwaves inside a reactor.

Radiating antennas solve part of the drawbacks of the applicators of the single-mode or multi-mode type, notably because they allow the radiation to be directly transmitted towards the interior of a reactor, thereby avoiding the use of a reactor transparent to the waves with all the constraints mentioned above.

Nevertheless, these applicators with radiating rectilinear antennas have a certain number of drawbacks. Firstly, the electromagnetic energy transmitted to the medium and the frequencies which may be used are limited by the actual properties of the antenna, i.e. in that the attenuation of the wave in an antenna depends on the frequency of the radiation and on dielectric characteristics of the reactive medium.

One of the main drawbacks of rectilinear antennas is the small length of the radiating portion which limits the energy which may be transferred by such a device and entails increased risks of dielectric breakdown at the interface between the antenna and the reactive medium, the consequence being the formation of quite undesirable electric arcs in the case of the treatment of flammable or explosive media.

Further, a heat treatment device provided with a radiating rectilinear antenna is limited to a given single frequency, depending on the dimensions of the antenna, and is limited to non-conductive dielectric reactive media having neither too great nor too low absorption. Conversely, the length of the antenna is itself limited by the frequency of the radiation and by the reactive medium. With such a radiating antenna, if the frequency of the radiation increases, the length of radiant antenna actually in the medium also decreases and also the electromagnetic energy transmitted to the medium also decreases.

Such a device cannot ensure a constant electric field in the medium.

In a known way, an antenna is a device for radiating electromagnetic waves. Such antennas never radiate in a uniform way, i.e. in the same way over the total length of the antenna. In fact, the energy radiated by an antenna is unevenly distributed in space or in a confined medium.

Thus, between the portion where the antenna is exposed to the reactive medium, said base of the antenna, and its free end, radiation is attenuated, in other words the radiation diagram is weakened along the antenna. This attenuation is illustrated in FIGS. 1a and 1b wherein a rectilinear radiating antenna respectively A1 and A2, is immersed in a reactive medium M. The radiating antenna A1 illustrated in FIG. 1a extends over its whole length in the reactor R, here consisting of a container filled with the reactive medium M, while the radiating antenna A2 illustrated in FIG. 1b corresponds to an end portion of an internal conductor Cin of a coaxial cable C which has been stripped; the coaxial cable comprises an external conductor Cout, a dielectric layer Cd and the internal conductor Cin, wherein the external conductor Cout and the dielectric layer Cd have been removed in order to expose a length portion of the internal conductor Cin which thus forms the antenna A2.

The antennas A1 and A2 radiate electromagnetic energy into the medium M, the radiation diagram bearing reference D in the figures. The propagation velocity and the attenuation of the wave depend on the dielectric characteristics of the medium. The attenuation of the wave may vary from a factor of one to a thousand depending on the reaction media, for example water will attenuate the wave about a thousand times more than a very weakly polar medium such as for example hexane.

In practice, the dielectric constants may be caused to vary during a chemical reaction, as the reagents gradually transform while adopting dielectric characteristics which change constantly.

Depending on the medium, the effective radiating length LR of the antenna is more or less long from the point where the antenna is exposed to the medium, so that the radiation is very localized. In a sufficiently homogeneous medium, such as for example molten glass, or in a not very absorbent medium, the effective radiating length may substantially correspond to the total length of the antenna. On the other hand, in other media, attenuation of the radiation occurs relatively rapidly along the antenna, thereby corresponding to a very short effective radiating length LR, in certain cases limited to a few centimeters.

Thus, such antennas have the drawback that the heating by dielectric loss is more or less homogeneous in the medium. Further, the heating is more or less well distributed along the antenna during a reaction wherein the dielectric constants change over time.

Further, these antennas generally require shielding against the radiation, in particular when the reactor is of the wave-transparent type, such as for example in glass or in Pyrex conventionally used in chemistry laboratories.

BRIEF SUMMARY

The invention solves all or part of these drawbacks and for this provides a device for applying electromagnetic energy to a reactive medium, said device being intended to be coupled with an electromagnetic radiation generator via means for transmitting said radiation, characterized in that it comprises at least one lossy transmission line having an interface for transferring electromagnetic energy towards the reacted medium, said transfer interface being arranged so as to ensure along said line a predetermined distribution profile of the density of electromagnetic energy delivered to said medium by said line.

Thus, with the invention, it is possible to control the distribution profile of the electromagnetic energy density, by adapting the lossy transmission line according to the treated medium, the desired reactions, the areas at which it is desired to apply or not a predetermined amount of electromagnetic energy. With the invention it is for example possible to obtain such a substantially constant profile along the line, so that the application of the energy is substantially homogeneous all along this line, with which it is notably possible to contemplate application in reactors of the tubular types, for example of the rectilinear or serpentine type, with a substantially equal application of electromagnetic energy all along the reactor.

Such a lossy transmission line is much more advantageous than an antenna which radiates without any control on the attenuation, and thus without any control on the areas of the reaction medium which desirably is to be subject to the effects of electromagnetic radiation.

Further, with such an application device, it is possible to obtain with a single lossy transmission line, a given distribution profile of the electromagnetic energy density, like a uniform profile corresponding to homogeneous application of the energy all along the line.

With the application device, it is also possible to have a given distribution profile of the electromagnetic energy density which extends between the beginning of the lossy transmission line and the end of the lossy transmission line. With an antenna wherein only an end portion radiates, the distribution profile of the energy density only begins from this exposed portion. With a completely exposed antenna, the distribution profile of the energy density begins at the beginning of the line so as to be completely attenuated before the end of the line. In both cases, with an antenna, it is not possible to have a distribution profile of the energy density all along the antenna.

A lossy transmission line is coupled with the reactive medium, in order to apply electromagnetic energy to the reactive medium, and it is by acting on this coupling or on this transfer interface all along the line that it is possible to control the aforementioned distribution profile.

Further, unlike antenna devices, the application device with a lossy transmission line may be used with low or even very low frequencies. The latter feature and the fact that the radiating surface may be very large, so that the application device with a lossy transmission line may be adapted in the case of radiations, to the transmitted powers practically without any limitation, the only limitation to the power level being the performances of the electromagnetic radiation generators.

Another advantage of the application device with a lossy transmission line lies in the possibility of transferring energy into the most diverse media, including ionic media, which is not the case of antenna devices.

The transfer interface of the transmission line is distinct between at least one first and one second cross-section of said line, electromagnetic energy being delivered to the medium at each of these cross-sections.

By cross-section, is meant a section of the lossy transmission line in a plane substantially normal to the longitudinal axis of said line. Thus, in different cross-sections of the transmission line, the coupling between the line and the medium and therefore the transfer interface with the medium are different; the coupling or the transfer interface being of course non-zero at these cross-sections, i.e. the lossy transmission line delivers electromagnetic energy at these cross-sections.

Thus, the transfer of energy may occur all along the line in a controlled way, and not in a inhomogeneous and diffuse way as this is the case with a radiating antenna wherein the transfer interface is the same all along the antenna, i.e. regardless of the cross-section of the antenna, the transfer interface remains the same.

In an embodiment, the transfer interface of the lossy transmission line varies continuously, notably regularly or discontinuously, notably by steps, between the first and the second cross-section.

According to a feature, the transfer interface of the lossy transmission line increases between the first cross-section which is located at the beginning of the lossy transmission line, and the second cross-section which is located at the end of the lossy transmission line.

Thus, the coupling between the lossy transmission line and the medium increases between the beginning and the end of the line, so that it is for example possible to have a substantially uniform distribution profile of the energy density delivered to the medium along said line.

At the beginning of the line, at the first cross-section, the coupling and therefore the transfer interface are provided so that the reactive medium consumes a percentage x of a total amount T of electromagnetic energy entering the beginning of the line. Thus, an energy amount Q1 is transferred to the reactive medium at this first cross-section, or an amount of energy Q1 is consumed by the reactive medium at this first cross-section, where:

$$Q1 = x\% \, T$$

At the end of line, at the second cross-section, the coupling and therefore the transfer interface are provided so that the reactive medium consumes a percentage y of the remaining electromagnetic energy R at the end of the line. While neglecting intrinsic attenuation of the wave along the lossy transmission line, and assuming that said lossy transmission line is coupled with the reactive medium only at the first and at the second cross-section, the following relationship is obtained:

$$R = T - Q1 = (100-x)\% \, T$$

Thus, the amount of energy Q2 transferred to the reactive medium at this second cross-section or the amount of energy consumed Q2 by the reactive medium at this second cross-section is the following:

$$Q2 = y\% \, R.$$

In order that the energy transferred between the lossy transmission line and the medium be quasi identical between both sections, corresponding to the relationship Q1=Q2, the coupling between the line and the medium should be better at the second cross-section relatively to that at the first cross-section, i.e. the transfer interface should be larger at the second cross-section relatively to that at the first cross-section, so that the percentage y is at least greater than the percentage x; the purpose being to compensate the fact that energy is consumed at the beginning of the line leading to an attenuation of the signal along the line.

According to a particular embodiment, the lossy transmission line has geometry adapted to the desired distribution profile of the electromagnetic energy density delivered to said medium, notably a variable transverse geometry over the whole length of the line.

The geometry may thereby be adapted to:
- all types of reactors, such as continuous reactors, discontinuous or <<batch>> reactors, rectilinear reactors, serpentine reactors, reactors with a small or large reaction volume, depressurized or pressurized reactors for example of the autoclave type; and/or
- all reactive media, whatever the dielectric constants of the reactive medium; and/or
- all frequencies from a few Hz to several GHz.

It is a matter of fact that, in the whole of the description, a lossy transmission line comprises at least one first and one second electric conductor at least partly insulated from each other by means of an insulator having suitable dielectric characteristics, the first conductor being intended to be coupled with the generator on the one hand and with the reactive medium on the other hand, in order to allow application of the generated electromagnetic energy to said reactive medium according to the predetermined distribution profile of the electromagnetic energy density.

Thus, control of the coupling between the first conductor and the medium ensures control of the distribution profile of the electromagnetic energy density. It is thus possible to increase coupling at the end of the line relatively to that at the beginning of the line, in order to compensate the attenuation of the wave (of the electric field) along the line due to energy consumption by the medium between the beginning and the end of the line, and thus to apply as much energy at the beginning then and at the end of the line.

As regards the second conductor, the intention may be to have it extend inside a reactor in which said reactive medium is positioned, in other words have it immersed in said reactor.

According to a feature, the reactive medium is positioned around said second conductor, the insulator consisting of suitable dielectric material, for example silica, alumina, ceramics, polytetrafluoroethylene, etc.

Such a lossy transmission line would be obtained from a standard transmission line, i.e. without losses, notably a non-dispersive line, wherein the propagation velocity of the waves is independent of frequency. This transmission line is modified as described later on by creating lossy areas by coupling with the external medium, in order to obtain a lossy transmission line according to the invention. With such a lossy transmission line, it is possible to transfer electromagnetic energy over any length of the line, thereby allowing an increase in the surface area for transferring electromagnetic energy to the reactive medium and thus in the electromagnetic energy transferred with a single applicator.

According to an alternative, the reactive medium may be at least partly positioned between the first and the second conductor, the insulator at least partly consisting of the reactive medium.

According to another alternative, the second conductor forms the wall of a reactor inside which said reactive medium is positioned, and the dielectric insulator at least partly consists of the reactive medium.

In the previous cases, the second conductor forms a shield between the radiation from the first conductor and the outside of the reactor, advantageously providing protection against any radiation towards the outside of the reactor.

Unlike an applicator with a radiating antenna of the state of the art, it is therefore unnecessary to provide an additional shield around the antenna or around the reactor; this resulting from the fact that two distinct phenomena are at play: with the antenna, one is faced with heterogeneous radiation along the antenna, while with a lossy transmission line, one is faced with propagation of a wave between two conductors, this propagation being accomplished in an insulator which may partly or totally be the reactive medium, and this line losing energy in the external medium by adequate coupling between the first conductor and said reactive medium.

In another embodiment, the second conductor has a variable transverse geometry along the line in order to obtain a variable transfer interface between the first conductor and the reactive medium and therefore variable coupling between said first conductor and the reactive medium.

For example, the second conductor consists of two conductive strips positioned in parallel on either side of the first conductor, the cross-section of said strips, and notably their width, varying along the line. In this example, the lossy transmission line is obtained from a transmission line of known type, a <<strip line>>.

In another example, the second conductor consists of a tubular profile surrounding the first conductor and in which is made at least one recess, the transverse dimensions of the recessed portion of the second conductor being distinct between at least two cross-sections of the line. In this example, the lossy transmission line is obtained from a transmission line of the coaxial cable type.

Advantageously, at least two recesses of elongated shape are made in the second conductor, said recesses being with a distinct tilt relatively to the longitudinal axis of the transmission line losses, notably with a first recess at the beginning of the lossy transmission line, substantially parallel to said longitudinal axis and with a second recess at the end of the lossy transmission line, substantially perpendicular to said longitudinal axis. Thus, the tilt of the recesses varies along the line.

In the following, the recesses are described as being shaped as slots, although they are not limited to this particular shape. The tilt of the elongated slots relatively to the longitudinal axis of the line may thus decrease along the line, so that the elongated slots located at the beginning of the line are substantially parallel to said longitudinal axis and the elongated slots located at the end of the line are substantially perpendicular to said longitudinal axis. Thus, the perpendicular slots at the end of the line have coupling with the external medium which is greater than the coupling of the parallel slots, in order to compensate the attenuation of the wave along the line, due to consumption of energy by the medium between the beginning and the end of the line, and to finally obtain a homogeneous distribution of the electromagnetic energy transmitted to the reactive medium.

A cross-section of the line at the first slot parallel to the longitudinal axis has a transfer interface with the medium with a size equal to the width of the slot; while a cross-section of the line at the second slot perpendicular to the longitudinal axis has a transfer interface with the medium with a size equal to the length of the slot. Thus, the transfer interface and therefore the coupling with the medium are greater at the second slot as compared with the first slot.

In a particular embodiment, the first conductor has a variable transverse geometry along the line in order to obtain a variable transfer interface between the first conductor and the reactive medium, and therefore variable coupling between the first conductor and the reactive medium.

Advantageously, the first conductor has a cross-section which increases between the beginning and the end of the lossy transmission line, notably continuously with a first conductor of general frusto-conical shape or discontinuously with a first conductor including steps with increasing sections. By increasing section is meant that the contour of the cross-section increases between the beginning and the end of the line, so that once again the end of the line has coupling with the external medium which is greater than the coupling at the beginning of the line, in order to compensate the energy consumption along the line and to finally obtain a homogeneous distribution of the electromagnetic energy transmitted to the reactive medium. Indeed, the coupling increases with the contour of the section since the dimensions of the transfer line between the first conductor and the external medium increase.

According to another embodiment, the insulator includes a sleeve in a dielectric material surrounding said first conductor, said sleeve being of a variable transverse geometry in order to obtain a variable transfer interface between the first conductor and the reactive medium.

In this embodiment, one acts on the geometry of the sleeve in dielectric material for controlling the coupling between the first conductor and the reactive medium.

For example, the sleeve is with a decreasing cross-section between the beginning and the end of the lossy transmission line; this cross-section of the sleeve may decrease continuously, for example by having a frusto-conical shape, or discontinuously by having for example a shape with steps of increasing section. Thus, the smaller the cross-section of the sleeve in dielectric material, the closer the reactive medium is to the first conductor, and therefore the higher is the coupling. In other words, the transfer interface between the first conductor and the reactive medium increases with the reduction in the thickness of the sleeve.

In a particular embodiment, the application device comprises at least one channel for circulating the reactive medium, surrounding the first conductor of said lossy transmission line over the whole or part of said line, said circulation channel being at least partly transparent to electromagnetic radiation.

This circulation channel participates in the coupling between the lossy transmission line and the reactive medium which it conducts.

Thus, the distance between said channel and said first conductor may vary along said first conductor in order to control the transfer interface between the first conductor and the reactive medium, and therefore the coupling of said first conductor with the reactive medium. Indeed, the channel may be more or less close to the lossy transmission line so that the reactive medium is more or less coupled with said lossy transmission line and accordingly receives more or less electromagnetic energy.

On the same principle but this time applied to the surface area of the reactive medium exposed to electromagnetic radiation, the cross-section of the circulation channel may vary along said first conductor in order to control the transfer interface between the first conductor and the reactive medium, and therefore the coupling of said first conductor with the reactive medium.

Still on this principle but this time applied to the positioning of the channel along the lossy transmission line, the surface density of the circulation channel may vary along said first conductor in order to control the transfer interface between the first conductor and the reactive medium, and therefore the coupling of said first conductor with the reactive medium. By this it is meant that depending on the location where one is located along the line, the channel has a more or less high contact surface and this independently of the actual section of the channel. For example, in the case of a spiral tube with a constant section forming said channel, a surface density substantially corresponds to the number of turns of the tube per unit length. Thus, the number of turns on a length portion of the lossy transmission line may be different from the number of turns on another length portion of the lossy transmission line, thereby corresponding to two distinct surface densities.

In a particular embodiment of the channel, the circulation channel comprises at least one hollow tube with a general spiral shape.

According to a feature, the pitch of said tube varies along the lossy transmission line, notably in the case of a reduction of the pitch towards the end of line, thus corresponding to a variation of the surface density as described above.

According to another feature, the diameter of said tube varies along the lossy transmission line, notably in the direction of an increase in said diameter towards the end of line.

According to another particular embodiment of the channel, the circulation channel is partly delimited by a spiral groove made on the external face of a hollow body surrounding the first conductor.

According to a feature, the pitch of said groove varies along the line, notably in the direction of a reduction in the pitch towards the end of the line.

According to another feature, the depth of the groove varies along the lossy transmission line, notably in the direction of an increase of said depth towards the end of the line.

The invention also relates to an assembly comprising a device for applying electromagnetic energy to a reactive medium and a reactor inside which said reactive medium is positioned, wherein said application device extending at least partly inside said reactor is as described above.

Generally, the reactor includes a cavity containing said reactive medium, said lossy transmission line extending inside said cavity.

This cavity may directly collect the reactive medium which is in solid, liquid or gas form, and for example form a discontinuous or <<batch>> reactor.

The reactor may comprise means for circulating said medium between an inlet and an outlet of said reactor, in order to form a continuous reactor. The circulation means may comprise at least one circulation channel as described above, such as for example the spiral tube or the hollow body with grooves, said channel extending inside said reactor. In the case of the hollow body with grooves, the circulation channel is also delimited by an internal face of the reactor, the hollow body being mounted in said rector with very small play.

According to a feature, the assembly comprises means for stirring said reactive medium inside said reactor.

In an embodiment of the stirring means, the latter comprise at least one propeller positioned in said reactor and rotationally mobile. The axis of symmetry of the propeller is advantageously parallel or even coincident with said longitudinal axis of the lossy transmission line; the propeller extending around the first conductor of the lossy transmission line. The propeller is driven into rotation notably by means of a rotary motor positioned at one of the ends of the reactor, on the outside of the latter.

In another embodiment of the stirring means, the latter comprise a rotationally mobile stirrer immersed in the reactive medium and extending beside or parallel to the lossy transmission line.

According to another feature, the assembly comprises means for controlling the temperature of said medium. These control means may be formed by a jacket surrounding at least partly said reactor and inside which circulates a cooling or heating fluid; the jacket forming a double envelop.

Thus, the reactor has a jacket inside which a heat transfer fluid may circulate in order to maintain the reactive medium at a given temperature and more widely in order to control the temperature of said medium. The control means may limit the temperature of the medium, notably in the case of thermal runaway inside the reactor or of reactions including an exothermic phase, by circulating a coolant fluid in the jacket, such as for example refrigerant fluids or cryogenic fluids.

With the jacket it is also possible to use a cryogenic fluid for treating fragile molecules during the treatment of materials of biological origins. It is notably known that certain proteins may undergo degradations at temperatures below 50° C. while the irradiation of biological matrices by electromagnetic radiation promotes extraction of proteins from materials of biological origins.

Further, the dimensions of the jacket may be adapted so as to have a more or less large heat exchange surface area relatively to the volume of the treated reactive medium and depending on the sought effect.

According to another feature, the assembly comprises means for pressurizing said cavity, so that the reactions may be carried out under a given pressure.

In an embodiment of the reactor, the latter has a general rectilinear shape, for example in the general shape of a straight tube with a cylindrical section, and the lossy transmission line then also has a general rectilinear shape.

In another embodiment of the reactor, the latter is of a generally serpentine shape, with for example at least two rectilinear sections parallel with each other and connected through a 180° bend, and the lossy transmission line is then also of a general serpentine shape.

The advantage of a serpentine reactor is having a long circulation path for the reactive medium, without however having a reactor with a too great length, particularly adapted for reactions in a medium not very absorbent to waves.

In the different embodiments of the reactor, the most important is that the lossy transmission line is adapted to the shape of the reactor and of its cavity, in order to allow a controlled, for example homogeneous, distribution of the electromagnetic energy transmitted to the reactive medium. Such a shape adaptation of course cannot be contemplated with radiating antennas of the state of the art.

The invention also relates to a device for treating with electromagnetic radiation a reactive medium, comprising an electromagnetic radiation generator, means for transmitting said electromagnetic radiation, and an assembly as described above wherein the application device is coupled with said generator via said transmission means.

According to an advantageous feature, the device comprises means for matching the impedances between the generator, the transmission means and the application device, in order to optimize transfer of energy generated by the generator to the reactive medium.

Ideal matching corresponds to the case when the power emitted by the generator is equal to the power transferred to the reactive medium at the interface with the lossy transmission line, which itself is equal to the power consumed by the reactive medium. In order to avoid undesirable wave returns and to have continuous matching of the impedances, the lossy transmission line should preferably have a defined impedance which will be adjusted continuously by means of an automatic system located at the transmission means and described below. Advantageously, the impedance of the lossy transmission line will be about 50 Ohms.

In a first embodiment, the electromagnetic radiation is of the micro-wave type.

In this case, the transmission means comprise a wave guide.

According to a feature, the wave guide communicates with a coupling cavity inside which extends the first conductor of the lossy transmission line in order to provide coupling between said first conductor and said wave guide. Thus coupling is simply carried out by irradiation of the first conductor with the radiation directly guided up to it by the wave guide.

According to another feature, the device comprises a hollow sleeve delimiting a space inside which the first conductor extends on the one hand and a short-circuit piston is translationally mobile on the other hand, said space being contiguous with said coupling cavity. The short-circuit piston slides around the end of the first conductor opposite to the reactor. The hollow sleeve and the first conductor thereby define a coaxial transmission line section.

The short-circuit piston allows impedance matching of the lossy transmission line, as described above and thus participates in the desired impedance matching for optimization of the energy transfer. The adjustment is simply accomplished by means of a rod integral with the piston and crossing the sleeve through a slot, it is then sufficient to move the rod in the slot, adjust the position of the piston and provide the matching. This movement of the piston may be motorized, allowing for automatic and continuous matching.

In this first embodiment the matching means comprise a first matching member such as a short-circuit piston, translationally mobile in the wave guide, and a second matching member such as a variable coupling iris, also translationally mobile in the wave guide. The first and second matching members are positioned in the wave guide on either side of the reactor, and thus on either side of the application device.

Both of these matching mobile members allow optimization of the energy transfer between the wave guide and lossy transmission line. The displacement of these two mobile adaptation members may also be motorized, in order to allow automatic and continuous matching.

In a second embodiment, the electromagnetic radiation is of the high frequency type.

In this case, the transmission means may comprise a transmission cable, notably of the coaxial cable type, connected to the output of the high frequency radiation generator.

According to a feature, the adaptation means comprise an electric matching means placed in series on said transmission cable.

This electric matching system may be of a known type, with for example an inductor and a first variable capacitor in series on the transmission cable, and a second variable capacitor positioned in parallel between the transmission cable and a reference potential.

The device according to the invention may thus form a device for heat treatment of a reactive medium in order to produce given chemical reactions by applying electromagnetic energy according to a distribution profile of the electromagnetic energy density delivered along the lossy transmission line, said profile being selected depending on the desired chemical reactions.

The device according to the invention may be used as a device for extracting substances of biological origins, notably substances of plant or animal origins or from micro-organisms by applying electromagnetic energy to a reactive medium containing materials of biological origins, notably materials of plant or animal origins or from micro-organisms, in suspension in at least one solvent; the solvent may be of the aqueous type like water, and the solvent may be transparent to electromagnetic radiation or not.

For example, the device may be used for extracting any substance of biological origins, such as for example of plant, animal origins or stemming from resources of biotechnologies.

For extracting molecules of biological origins, it is particularly important to be able to use means for accurately controlling the temperature, and more particularly for limiting the temperature, during irradiation by electromagnetic waves of the biological materials in an aqueous phase or in suspension in solvents. According to a particular embodiment of the invention, the jacket may have a more or less large surface area for heat exchange relatively to the irradiated volume in order to avoid thermal degradation of the sensitive substances, immediately after the extraction from their biological matrices. With the jacket, it is for example possible to use cryogenic fluids in order to produce reactions or extractions at low temperatures by applying high electromagnetic energy densities.

The device according to the invention is thus particularly suitable for such applications for extracting substances of biological origins, since with the invention it is possible to transfer electromagnetic energy inside a metal enclosure with a jacket providing a large surface area for heat exchange relatively to the treated volumes.

BRIEF DESCRIPTION OF THE DRAWINGS

Other features and advantages of the present invention will become apparent upon reading the detailed description hereafter, of a non-limiting exemplary embodiment, made with reference to the appended drawings wherein:

FIGS. 6a to 6d are cross-sectional views of a transmission line of the <<strip line>> type (FIG. 6a) and of several sections of a lossy transmission line (FIGS. 6b to 6d) respectively, obtained by modifying the transmission line illustrated in FIG. 6a;

FIGS. 7a and 7b are views of a transmission line of the coaxial cable type in a cross-sectional and perspective view respectively;

FIGS. 8a, 8b and 8c are views of a lossy transmission line in a first and a second cross-sectional view and in a perspective view respectively, obtained by modifying the transmission line illustrated in FIGS. 7a and 7b;

DETAILED DESCRIPTION

Figure 1A:
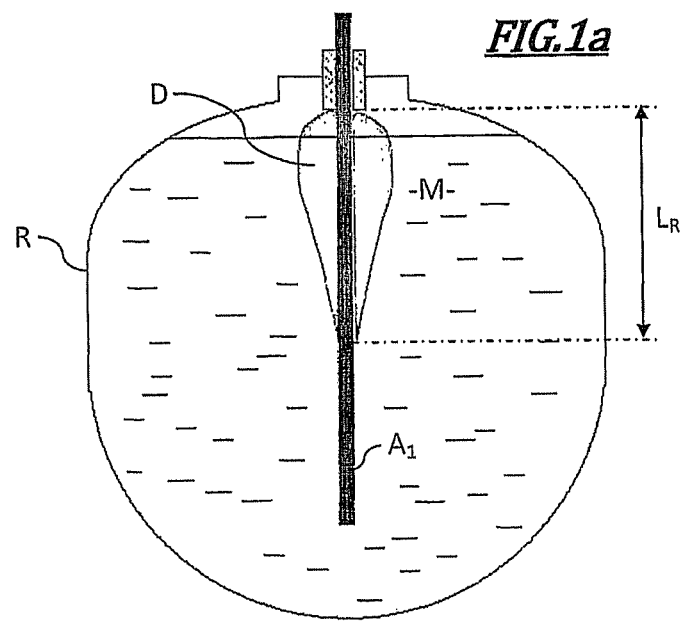
FIGS. 1a and 1b are schematic views of near field applicators with a radiating antenna of a known type.
Figure 1B:
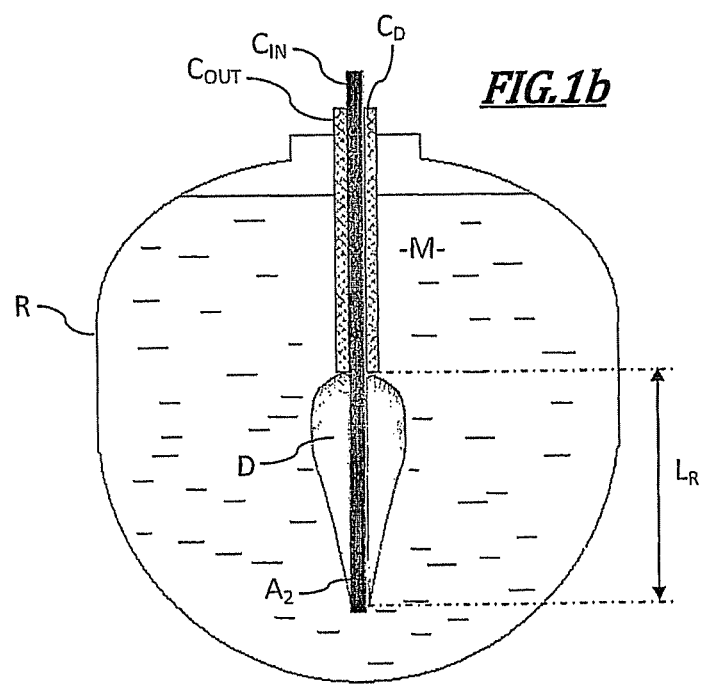
Figure 2:
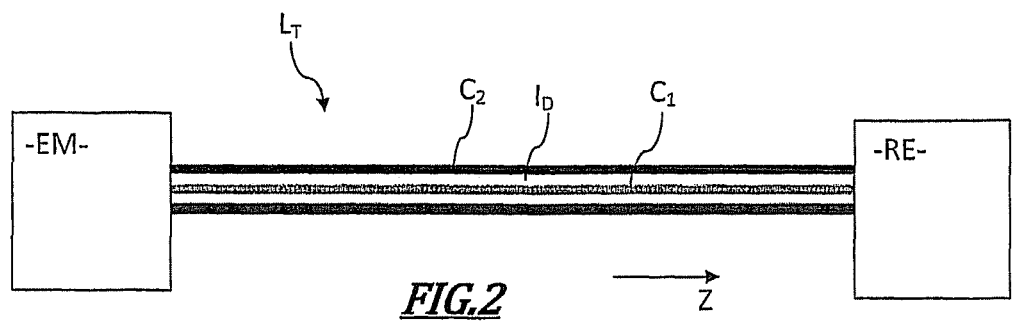
FIG. 2 is a schematic view of a transmission line.

FIG. 2 illustrates a transmission line LT which transmits a signal from an emitter EM to a receiver RE in the form of electromagnetic radiation which propagates inside said transmission line LT. The transmission line LT comprises two parallel electric conductors separated by a dielectric insulator ID (for example air or an adequate material of a known type): a first conductor C1, ensuring transmission of the signal, and a second conductor C2, a so-called return conductor, and which is for example connected to the ground. For transferring a maximum of power between the emitter EM and the receiver ER, it is essential to minimize the losses along the line, notably losses by the Joule effect because of the intrinsic resistance of the conductors C1, C2.

Figure 3A:
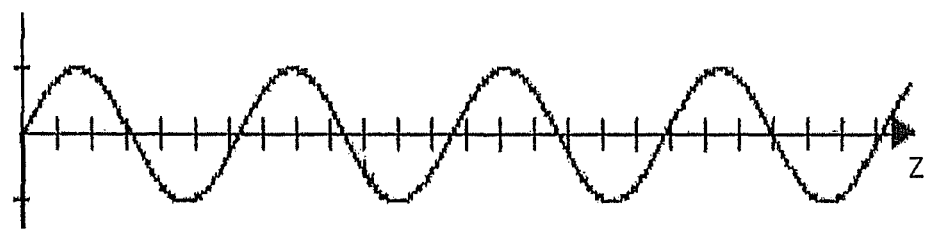
FIGS. 3a and 3b are diagrams illustrating the propagation of a wave in a lossless ideal transmission line and a lossy transmission line respectively.

FIG. 3a illustrates the behavior of an ideal transmission line without any losses along the line, wherein the amplitude of the wave corresponding to the energy transported by the wave, remains constant along the line (i.e. along the z direction) and therefore the transmitted electromagnetic energy is optimum.

Figure 3B:
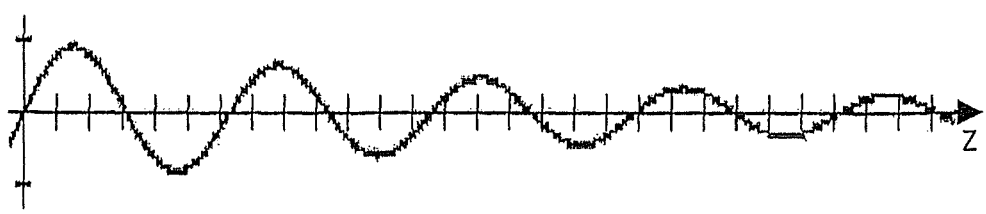

FIG. 3b illustrates the behavior of a lossy transmission line, wherein it is noted that the amplitude of the wave decreases along the line, i.e. it decreases between the beginning of the line on the emitter side and the end of the line on the receiver side. As described later on, the invention causes such losses and even controls these losses, in order to use a lossy transmission line as a device for applying electromagnetic energy into a reactive medium. With the invention, the losses in the lossy transmission line form the source for transmitting electromagnetic energy to the reactive medium.

FIGS. 4a to 4e illustrate different embodiments of a transmission line, which appears as a profile with constant section.

Figure 4A:
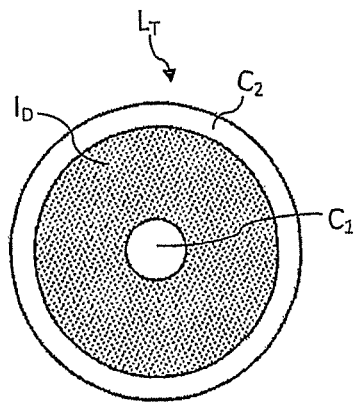
FIGS. 4a to 4e are cross-sectional views of transmission lines of the known type.

FIG. 4a illustrates a transmission line of the coaxial cable type including a first central conductor C1 of circular section, encased in a dielectric insulator ID, and then in a second tubular conductor C2.

Figure 4B:
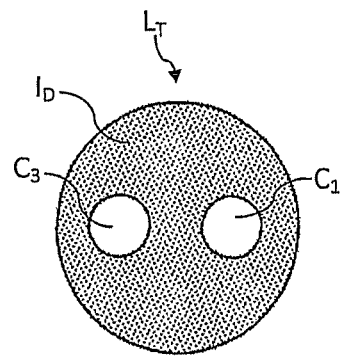

FIG. 4b illustrates a transmission line comprising two parallel conductors C1 and C3 encased in a dielectric insulator ID of circular section.

Figure 4C:
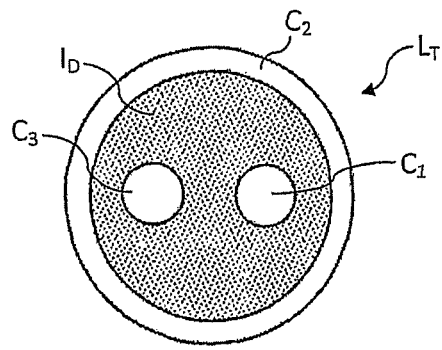

FIG. 4c illustrates a transmission line identical with that of FIG. 4a except that it further comprises a third conductor C3 parallel to the first conductor C1 and also encased in the dielectric insulator ID.

Figure 4D:
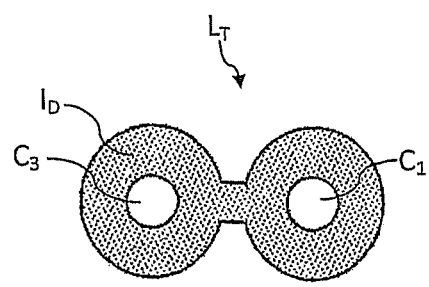

FIG. 4d illustrates a transmission line identical with that of FIG. 4b except that the dielectric insulator ID has a section with the general shape of an <<8>>, each conductor C1 and C3 being encased in one of the loops of the <<8>>.

Figure 4E:
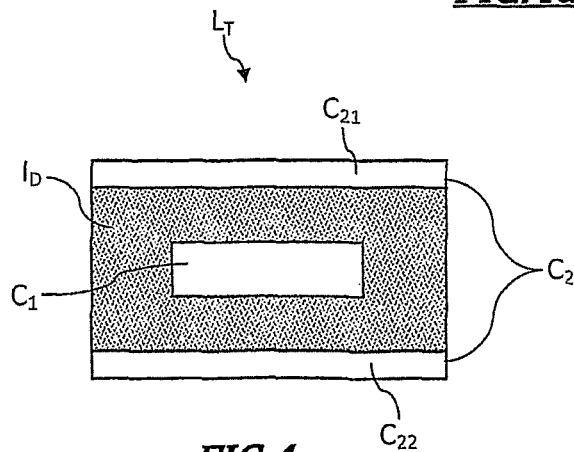

FIG. 4e illustrates a transmission line of the <<strip line>> type comprising a first conductor C1 of rectangular section encased in a dielectric insulator ID also of rectangular section, and a second conductor C2 composed of two conductive strips C21 and C22 parallel and positioned over the length of the dielectric insulator ID.

Figure 5A:
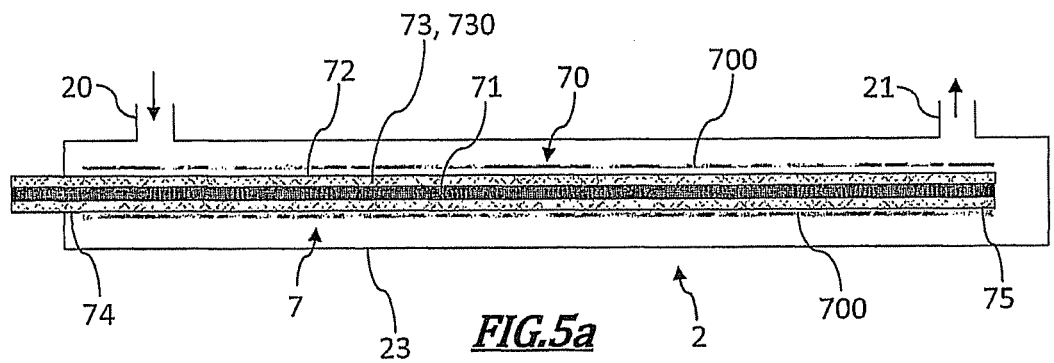
FIGS. 5a and 5b are schematic views of a lossy transmission line according to the invention extending in a continuous reactor and a discontinuous reactor respectively.

FIG. 5a schematically illustrates a reactor 2 of the continuous type comprising a tubular outer wall 23, a so-called reactor body, and having an inlet 20 upstream from the reactor 2 and an outlet 21 downstream from the reactor 2. Inside the reactor 2 is positioned an electromagnetic energy application device 7 including a lossy transmission line 70 adapted for transferring electromagnetic energy to the reactive medium circulating in the reactor 2. The illustration of the lossy transmission line 70 in FIG. 5a is purely symbolic and reference will be made to the following figures for understanding the different embodiments of said line 70.

Generally, and for the whole description which follows, the lossy transmission line 70 comprises:
a first conductor 71 coupled with the generator on the one hand and with the reactive medium on the other hand in order to allow application of electromagnetic energy,
a second conductor 72 positioned around the first conductor 71; and
an insulator 73 having adapted dielectric characteristics and encasing at least partly the first conductor 71 and positioned between both conductors 71 and 72.

In the embodiment illustrated in FIG. 5a, the first conductor 71 forms a rectilinear internal conductor, and the second conductor 72 forms an also rectilinear external conductor; the insulator 73 here composed of a sleeve 730 in a dielectric material which is interposed between the first conductor 71 and the second conductor 72.

Further, the lossy transmission line 70 is of the rectilinear type with:
an incoming portion 74 at which said lossy transmission line 70 opens out into said reactor 2, said incoming portion 74 corresponding to the beginning of the line for the description which follows, and
a free end 75 placed downstream from the reactor, said free end 75 corresponding to the end of the line for the description which follows.

The lossy transmission line 70 and more particularly its first conductor 71 are coupled with the reactive medium by means of a lossy transmission line wherein the second conductor has variable geometry and adapted as described hereafter for example with reference of FIGS. 6 and 8. The geometry of the lossy transmission line 70 is provided in order to obtain a distribution profile of the electromagnetic energy density delivered to the reactive medium which remains substantially constant or uniform all along the line, as illustrated in FIG. 5a by the continuous halo 700 representing the electric field around the lossy transmission line 70, thereby corresponding to a substantially homogeneous application of electromagnetic energy along the lossy transmission line 70. In order to obtain such a result, the principle is that the energy transfer interface increases along the line, in order to compensate the consumption of electromagnetic energy along the line; in other words, the invention notably provides that the transfer surface area per unit length is greater at the end of the line than at the beginning of the line, so that at the beginning of the line, the applied energy is substantially equal to the energy applied at the end of the line where the wave conveys lower energy than at the beginning of the line because of consumption of energy by the medium downstream from the end of the line.

In order to obtain such a variation of the transfer interface between the lossy transmission line 70 and the reactive medium, it is notably possible to act on the following parameters, either alone or as a combination:

- the geometry of the lossy transmission line 70, like the geometries of the first conductor 71, of the insulator 73 (and therefore of the sleeve 730) and of the second conductor 72;
- the contact surface provided by the reactive medium around the lossy transmission line 70, this surface area being constant in the case of a lossy transmission line 70 directly immersed in a reactive medium, but this surface area may be controlled in the case of a medium circulating in a circulation conduit where it is then possible to act on the geometry of the conduit between the beginning and the end of the line, notably so that the reactive medium provides a larger surface area exposed to the radiation per unit length at the end of the line than at the beginning of the line.

Of course, the transfer interface between the lossy transmission line and the reactive medium may be adapted in order to obtain distribution profiles of the electromagnetic energy density delivered to the reactive medium, other than a uniform profile, such as for example a profile corresponding to a greater application of electromagnetic energy in the middle of the line relatively to applications at the beginning and at the end of the line; such a control of the distribution profile of the electromagnetic energy density delivered to the reactive medium being particularly advantageous for controlling certain chemical reactions with continuous circulation of the reactive medium, where it is required that predetermined amounts of energy be applied in predetermined portions of the circulation of the reactive medium.

Figure 5B:
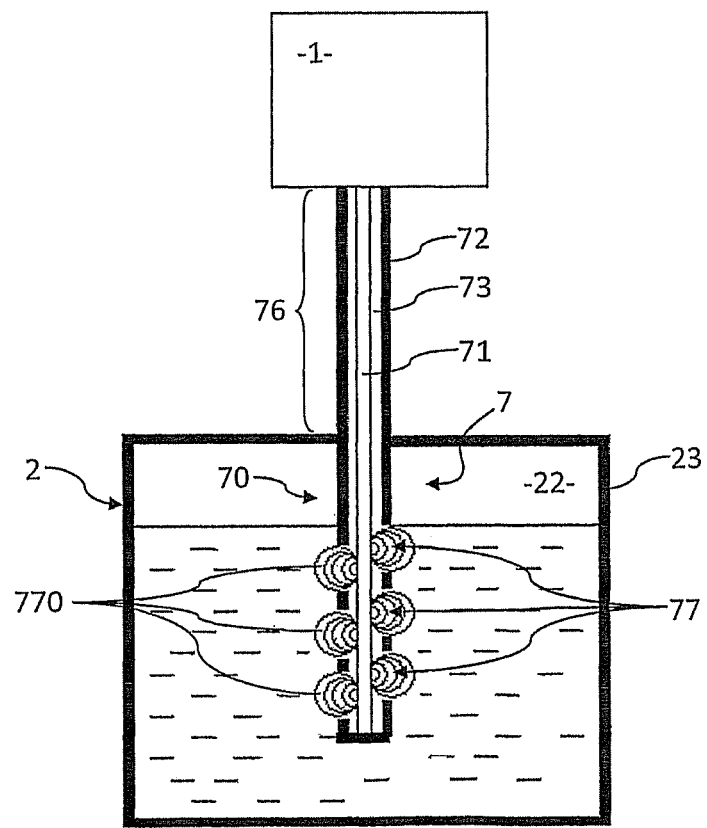

FIG. 5b schematically illustrates a reactor 2 of the discontinuous or batch type, the external wall 23 of which delimits a cavity 22 containing the reactive medium and inside which extends the lossy transmission line 70 according to the invention. It is noted that the lossy transmission line 70 is directly coupled with an electromagnetic radiation generator 1, said lossy transmission line 70 has an external portion 76 extending on the outside of the reactor 2, and along which the losses have to be minimum in order that the maximum of electromagnetic energy generated by the electromagnetic radiation generator 1 is applied to the reactive medium. In this embodiment, one acts on the geometry of the lossy transmission line 70 in order to obtain a predetermined distribution profile of the electromagnetic energy density, in this case a substantially uniform profile. For this, recesses 77 are made in the second conductor 72, these recesses 77 having geometry adapted to the desired distribution profile of the electromagnetic energy density. In FIG. 5b, the lossy transmission line 70 has 6 recesses 77 including two at the beginning of the line, two in the middle of the line and two at the end of the line. To these recesses 77, correspond radiation losses in the reactive medium illustrated by radiation lobes 770, so that application of energy at the recesses 77 at the beginning of the line is substantially identical with that in the middle and at the end of the line. A discrete distribution profile of electromagnetic energy density is thereby obtained and it is noted that it is possible to obtain a profile which gets closer to a continuous profile by for example increasing the number of recesses 77 along the line.

Figure 6E:
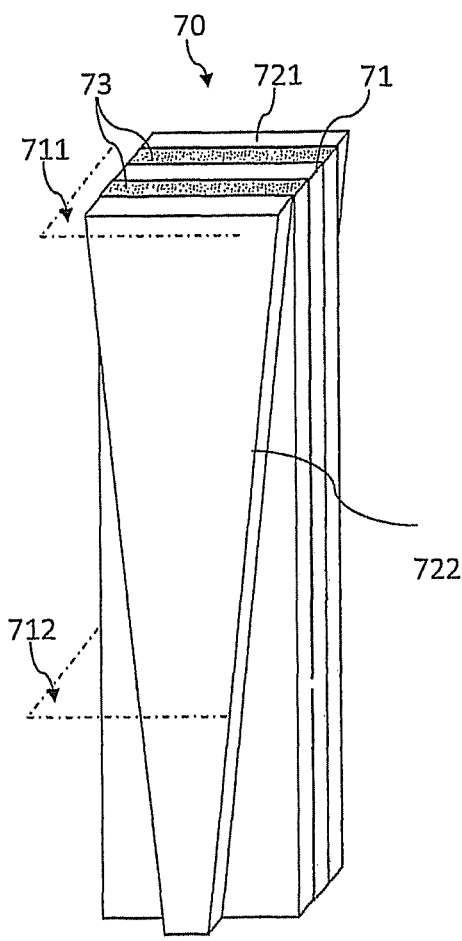
FIG. 6e is a perspective view of a lossy transmission line with a continuous section corresponding to the section illustrated in FIG. 6c.
Figure 6A:
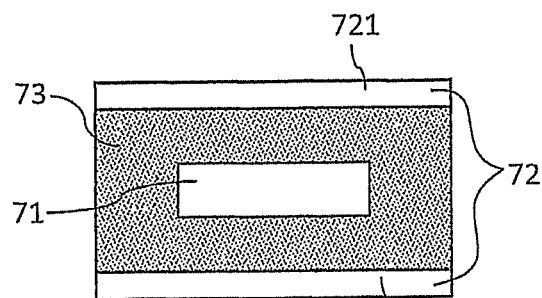
Figure 6B:
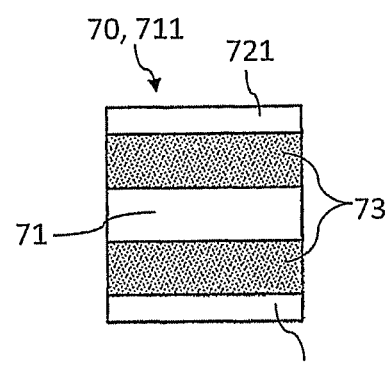
Figure 6C:
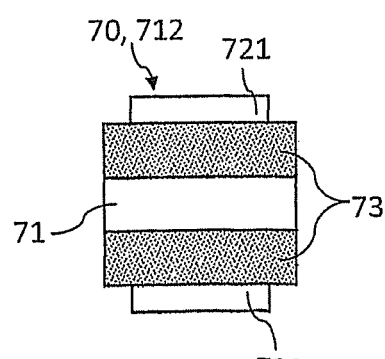

FIGS. 6b to 6c illustrate lossy transmission line 70 sections according to the invention, obtained from a standard transmission line, the section of which is illustrated in FIG. 6a.

FIG. 6a illustrates, like FIG. 4e, a strip line type transmission line comprising a first conductor 71 with a rectangular section encased in a dielectric insulator 73 composed of a suitable material and also with a rectangular section, and a second conductor 72 composed of two conductive strips 721 and 722 parallel and positioned over the length of the dielectric insulator 73. In a transmission line with such a section, the losses are quasi-zero since the width of the conductive strips 721 and 722 is larger than the width of the first conductor 71, so that they play a shielding role so that the wave propagates in the dielectric insulator 73 without radiating outwards.

Figure 6D:
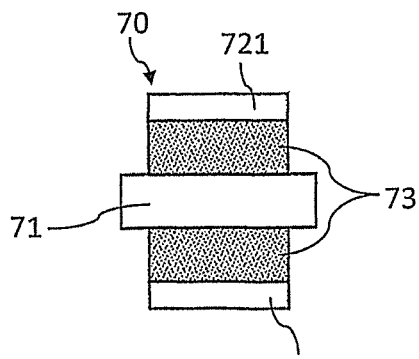

As illustrated in FIGS. 6a and 6d, in order to control the transfer interface between the lossy transmission line 70 and the reactive medium, provision is made for acting on the geometry of the lossy transmission line 70 and more particularly on the geometry of the second conductor 72 relatively to that of the first conductor 71, in order to control the losses along the lossy transmission line 70. Thus, in order to control the profile of the losses over the length of the line 70, it is possible to vary the width of at least one of the two conductive strips 721 and 722. Further, it is also possible to reduce the width of the dielectric insulator 73 so that it is equal to (FIGS. 6b and 6c) or less than (FIG. 6d) the width of the first conductor 71. The first cross-section 711 of the lossy transmission line 70 illustrated in FIG. 6b has a smaller coupling interface with the reactive medium than the second cross-section 712 illustrated in FIG. 6c; the width of the conductive strips 721 and 722 being larger at the first cross-section 711 than at the second cross-section 712. Thus, by controlling the width of the conductive strips 721 and 722 and possibly of the dielectric insulator 73, the interface for transferring energy with the reactive medium is controlled.

FIG. 6e illustrates a lossy transmission line 70 wherein the width of the conductive strips 721, 722 is decreasing between the beginning of the line 70, at the top of the figure, and the bottom of the line at the bottom of the figure; the widths here increasing regularly. In order to control the coupling interface with the reactive medium, the geometry of the section of the lossy transmission line 70 (or the transverse geometry of the lossy transmission line 70) varies along the line. For example, the width of the conductive strips 721 and 722 may decrease regularly or stepwise along the line, between the beginning and the end of the line, in order to compensate the attenuation of the wave along the line, due to consumption of energy by the medium between the beginning and the end of the line, and to thereby obtain a substantially uniform distribution profile of the electromagnetic energy density.

FIGS. 8a, 8b and 8c illustrate a lossy transmission line 70 according to the invention, obtained from a standard transmission line illustrated in FIGS. 7a and 7b.

FIGS. 7a and 7b illustrate a transmission line of the coaxial cable type which includes a first central conductor 71 of circular section, encased in a dielectric insulator 73 formed in a suitable material, and then in a second tubular conductor 72 forming shielding. In a transmission line with such a section, the losses are quasi-zero since the second conductor 72 completely surrounds the first conductor 71, along the whole of the line, so that the wave propagates in the dielectric insulator 73 without radiating outwards.

As illustrated in FIGS. 8a, 8b and 8c, in order to control the transfer interface between the lossy transmission line 70 and the reactive medium, provision is made for acting on the geometry of the lossy transmission line 70 and more particularly on the geometry of the second conductor 72, in order to control the losses along the lossy transmission line 70. Thus, in order to obtain such losses, provision is made for making recesses 77 in the second conductor 72 so that the lossy transmission line 70 radiates outwards via said recesses 77; the recesses 77 being illustrated as rectangular slots, the shape of the recesses of course not being limited to this particular slot shape. In order to control these losses, it is necessary to control the transverse dimensions of the recessed portion of the second conductor 72, these dimensions for example being distinct from the first cross-section 711 (illustrated in FIG. 8a) and the second cross-section 712 (illustrated in FIG. 8b) of the lossy transmission line 70. The recessed size of the second conductor 72 per unit length therefore varies along the line. It is thus possible to act on the number of slots and on the dimensions of the slots. In the example illustrated in FIG. 8c, two elongated slots of rectangular shape are illustrated, wherein a first slot 77 is parallel to the longitudinal axis of the lossy transmission line 70 (at the top of FIG. 8c and illustrated in FIG. 8a, the first cross-section 711 passing through this first slot) and wherein a second slot 77 is perpendicular to the longitudinal axis of the lossy transmission line 70 (at the bottom of FIG. 8c and illustrated in FIG. 8b, the second cross-section 712 passing through this second slot). Thus, the first slot 77 provides a coupling surface area per unit length with the reactive medium which is less than the one provided by the second slot 77. Thus, in order to compensate the attenuation of the wave in the lossy transmission line 70, it is necessary that the first slot be positioned at the beginning of the line and that the second slot be positioned at the end of the line. It is also possible to provide only one or several slots parallel to the longitudinal axis and the transverse dimension of which (in the direction perpendicular to the longitudinal axis of the lossy transmission line 70) continuously increases (triangle-shaped slot for example) or stepwise along the line, between the beginning and the end of the line. It is also possible to provide several elongated slots and the tilt of which relatively to the longitudinal axis of the lossy transmission line 70 increases so that the recess of the beginning of the line for example corresponds to the first slot illustrated in FIG. 8a and the slot of the end of the line corresponds to the second slot illustrated in FIG. 8b, the intermediate slots being increasingly tilted between the beginning and the end of the line.

Figure 9A:
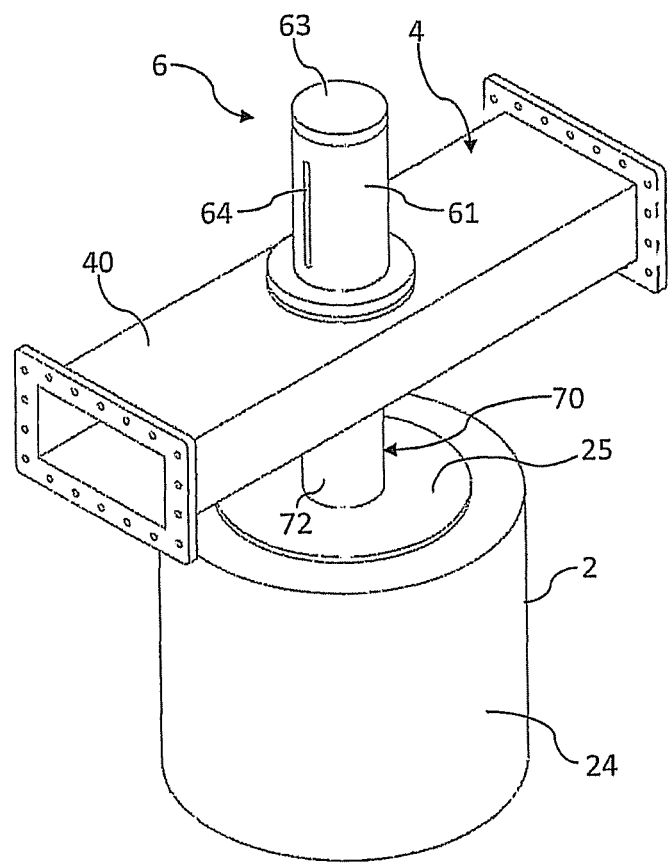
FIG. 9a is a perspective view of an assembly of a discontinuous reactor and of an application device according to the invention, wherein a portion of a wave guide coupled with the application device is also illustrated.
Figure 9B:
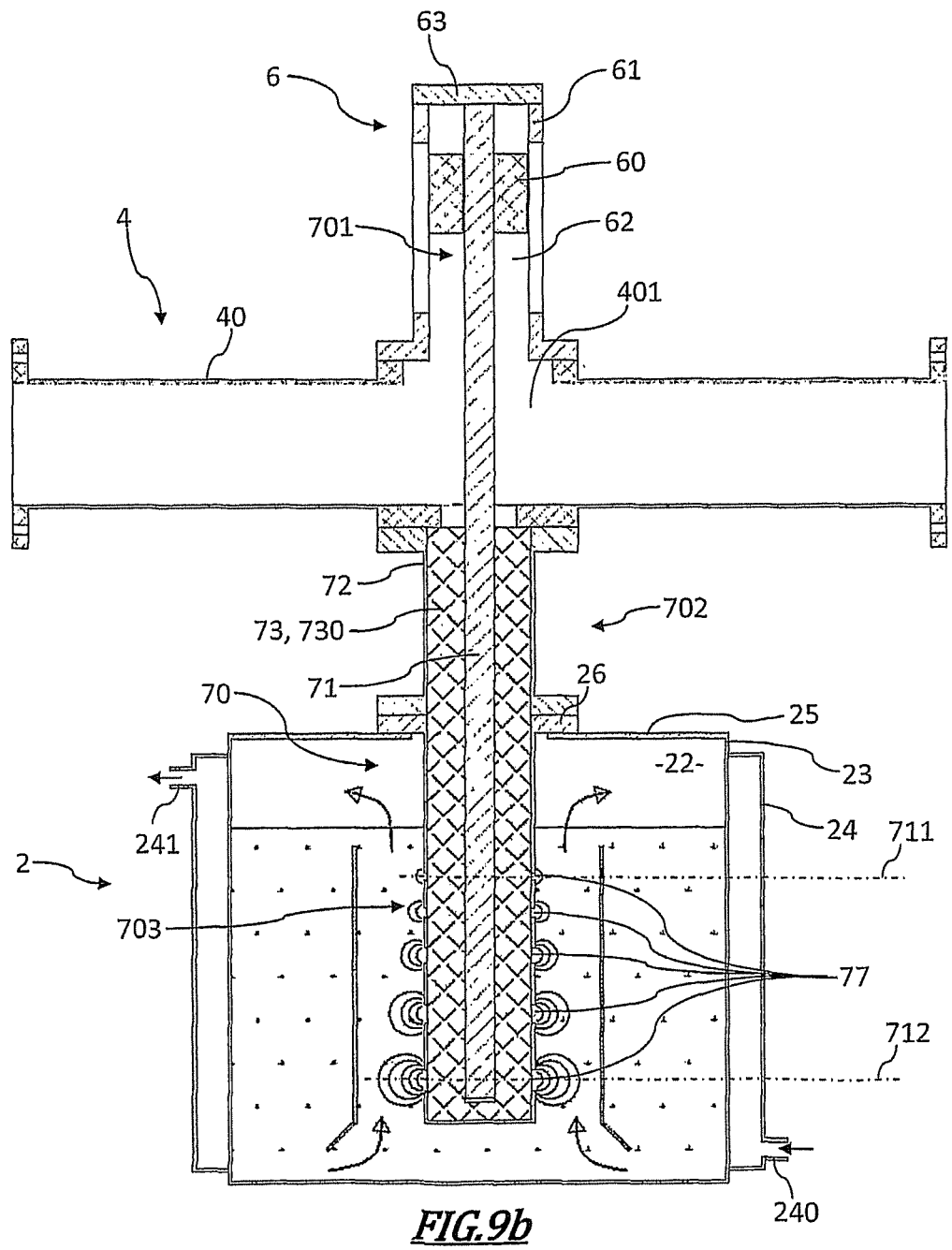
FIGS. 9b and 9c are middle sectional views of the assembly illustrated in FIG. 9a and including a first and a second embodiment of an application device according to the invention, respectively.
Figure 9C:
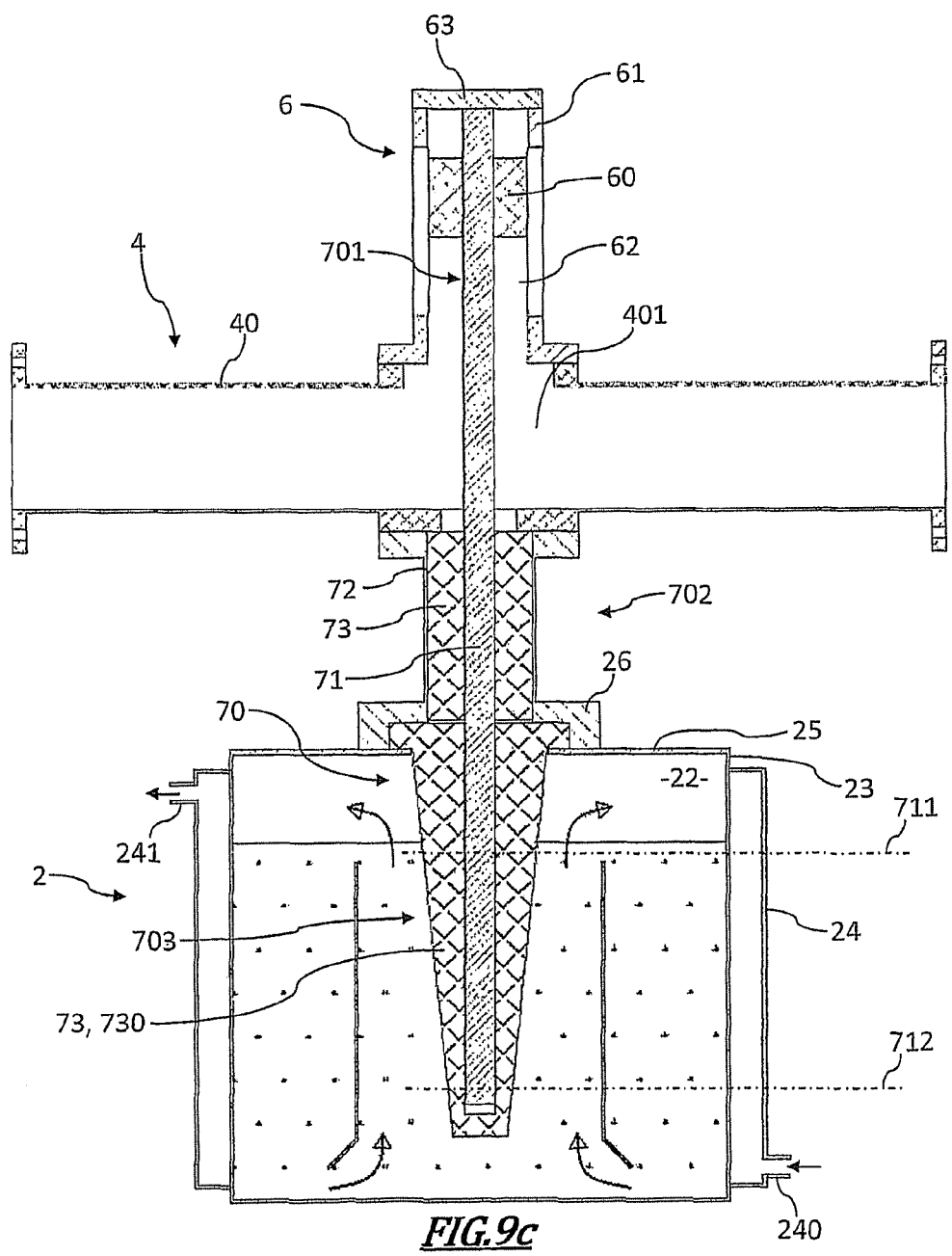

FIGS. 9a to 9c illustrate a reactor 2 of the discontinuous type, the external wall (or reactor body) 23 of which delimits a cavity 22 containing the reactive medium and inside which extends a lossy transmission line 70 according to the invention. The external wall 23 is at least partly surrounded by a jacket 24 surrounding the external wall 23 or reactor body, inside which a coolant fluid of the heat transfer fluid type or a coolant fluid or cryogenic fluid may circulate between an inlet 240 and an outlet 241 provided in the casing 24. The reactor 2 is sealed at its upper end 25 crossed by the lossy transmission line 70.

The lossy transmission line 70 is coupled with a wave guide 4 which transmits electromagnetic radiation advantageously of the microwave type. The wave guide 4 includes a coupling section 40 which extends normal to the lossy transmission line 70 and which is transversely coupled with said lossy transmission line 70. This section 40 of the wave guide 4 interiorly delimits a coupling cavity 401 inside which extends the first conductor 71 of the lossy transmission line 70; said first conductor 71 extending in said coupling cavity 401 without being surrounded by the dielectric insulator 73 and by the second conductor 72. Thus, the first conductor 71 is coupled with the wave guide 4 at this coupling cavity 401 in which said first conductor 71 receives the electromagnetic radiation conveyed by the wave guide 4.

The second conductor 72 and the dielectric insulator 73 extend around the first conductor 71 through said coupling cavity 401 and this as far as in the reactor 2; the dielectric insulator 73 assuming the shape of the sleeve 730 in dielectric material positioned between both conductors 71 and 72. Thus, the lossy transmission line 70 has three distinct portions:

a first portion 701 for coupling with the wave guide 4 and more generally with the electromagnetic radiation generator 1, wherein the first conductor 71 is exposed and is therefore not surrounded by the second conductor 72 and by the dielectric insulator 73;

a second connecting portion 702 between the wave guide 4 and more particularly the coupling cavity 401, and the reactor 2 wherein the first conductor 71 is completely surrounded by the second conductor 72 and by the dielectric insulator 73 so that minimum loss occurs along this intermediate portion; and a third portion 703 for applying electromagnetic energy to the reactive medium, said lower portion 703 extending inside the reactor 2.

The third portion 703 has the lossy transmission line configuration, such as for example illustrated in FIGS. 6b to 6e or in FIGS. 8a to 8c.

In the embodiment illustrated in FIG. 9b, the lossy transmission line 70 has recesses 77 made in the second conductor 77 along the third portion 703; said recesses 77 for example being of increasing dimensions between the beginning and the end of the line. Thus, the first cross-section 711 has a smaller transfer interface and therefore lower coupling with the reactive medium than those of the second cross-section 712 of the lossy transmission line 70.

In the embodiment illustrated in FIG. 9c, the transmission line 70 has a dielectric insulator 73 along the third portion 703 which comprises a sleeve 730 in dielectric material surrounding said first conductor 71, said sleeve 730 being of increasing section at the beginning and at the end of the line. Thus, the sleeve 730 has increasing thickness from the first conductor 71 with a general frusto-conical shape. Thus, the reactive medium is further away from the first conductor 71 at the beginning of the line than at the end of the line, so that the transfer interface increases between the beginning and the end of the line. For example, the first cross-section 711 has a smaller transfer interface and therefore lower coupling with the reactive medium than those of the second cross-section 712 of the lossy transmission line 70.

The lossy transmission line 70 crosses the upper end 25 of the reactor via a suitable seal gasket 26.

When the wave guide 4 is perfectly matched to the electromagnetic radiation generator 1 and to the lossy transmission line 70/reactive medium assembly, a condition which is met when the output impedance of the electromagnetic radiation generator 1 and the input impedance of the lossy transmission line 70/reactive medium assembly are equal to the characteristic impedance of the wave guide 4, the wave guide 4 is only covered by progressive waves and the maximum of electromagnetic energy is transmitted between the generator and the reactive medium.

In order to adapt the lossy transmission line 70/reactive medium assembly, the application device 7 comprises means 6 for matching the impedance of the lossy transmission line 70/reactive medium assembly. These matching means 6 comprise a short-circuit piston 60 slidably mounted and adjustable in position in a sleeve 61 positioned on the wave guide 4 in order to open out into the coupling cavity 401 on a edge opposite to the reactor 2. The sleeve 61 and the short-circuit piston 60 are aligned with the lossy transmission line 70, and more particularly the short-circuit piston 60 which is translationally guided around the first conductor 71, said first conductor 71 crossing said coupling cavity 401 in order to also extend inside the space 62 delimited by said sleeve 61. The first conductor 71 will abut against the end transverse wall 63 of said sleeve 61, the piston 60 being slidably mounted on this first conductor 71. By adjusting the position of the piston 60, the impedance of the lossy transmission line 70/reactive medium assembly is matched in order to optimize transfer of electromagnetic energy between the electromagnetic radiation generator 1 and the reactive medium. The sleeve 61 thus has a longitudinal slot 64, in order to let through means (not shown) for driving said piston 60 into motion such as a rod integral with the piston 60 on the one hand and coupled on the other hand with driving means of the manual or motorized type.

Figure 10:
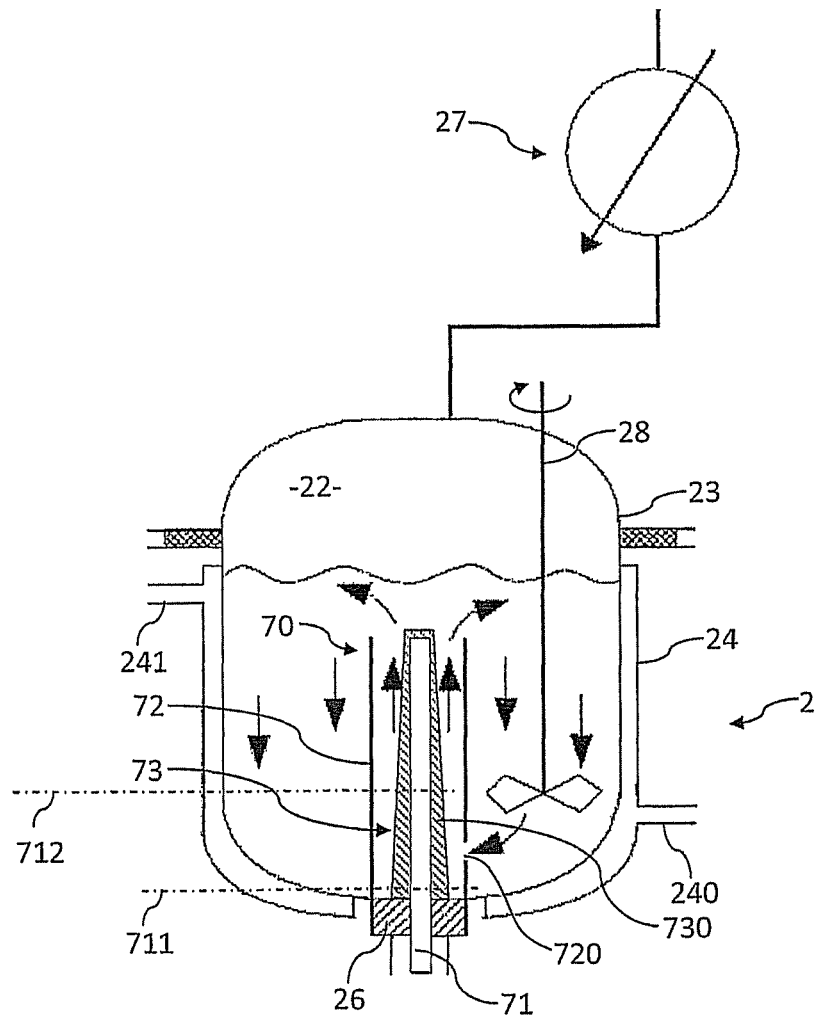
FIG. 10 is a schematic view of another discontinuous reactor with an application device according to the invention.

FIG. 10 illustrates another discontinuous reactor 2 which delimits a closed cavity 22, coupled with a venting condenser 27 in order to operate with backflow within said closed cavity 22.

The cavity 22 may also be connected to pressurization means, not shown, in order to operate under a determined pressure in said cavity 22. The pressurization means are of a known type, with adequate circuits for example comprising safety valves, a safety rupture disk, etc.

The reactor 2 may also comprise a jacket 24 of the same type as the one described above.

The reactor 2 may also comprise means 28 for stirring the reactive medium, in the form of a mechanical stirrer which sealably opens out into the cavity 22 and which is connected to means for driving it into rotation (not shown) such as a rotary motor.

The dielectric insulator 73 of the lossy transmission line 70 inside the reactor 2 at least partly composed of the reactive medium, which thus circulates between the first conductor 71 and the second conductor 72; the stirring of the reactive medium promoting this circulation between both conductors. Thus, the reactive medium with suitable dielectric properties partly forms the dielectric insulator 73 of the lossy transmission line 70 in the cavity 22. Thus, the reactive medium is coupled with the lossy transmission line 70 by being positioned between both conductors of said lossy transmission line 70. A sleeve 730 in a dielectric material surrounding the first conductor 71 is also provided with a frusto-conical shape as described hereinbefore with reference to FIG. 9b, the shape of said sleeve 730 being adapted to the desired energy density distribution profile. In this embodiment, the sleeve 730 is positioned around the first conductor 71 and spaced apart relatively to the second conductor 72 so that the reactive medium may circulate between the sleeve 730 and said second conductor 72. In a non-illustrated alternative, the sleeve 730 is positioned inside the second conductor 72, against its internal face and spaced apart relatively to the first conductor 71 so that the reactive medium may circulate between the sleeve 730 and said first conductor 71; the shape of the sleeve 730 being once again adapted to the desired coupling between the first conductor 71 and the reactive medium, since the thicker the sleeve 73 between the first 71 and the second 72 conductor, the lower is the coupling.

The first conductor 71 of the lossy transmission line 70 crosses the wall of the reactor 2 through a seal gasket 26 made in an insulating material, in order to allow transfer of electromagnetic energy. Outside the reactor 2, the lossy transmission line 70 may for example extend as described hereinbefore with the first portion and the second portion.

It is noted that the second conductor 72 has a passage 720 for letting through the reactive medium, for example at the beginning of the line, so that the reactive medium may circulate between the end of the line, open to the reactive medium, and this passage 720.

Figure 11A:
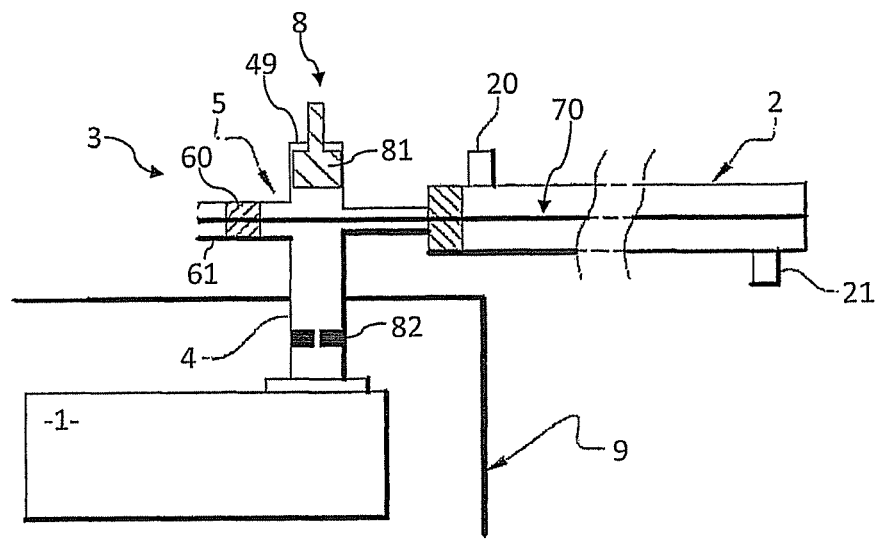
FIGS. 11a and 11b are schematic views illustrating a treatment device according to the invention, by applying radiation of the microwave (FIG. 11a) and high frequency type (FIG. 11b) respectively.

FIG. 11a schematically illustrates a device for electromagnetic treatment of a reactive medium by microwave radiation according to the invention, which comprises:
- a microwave radiation generator 1;
- a reactor 2 containing said reactive medium; and
- a device 3 for transmitting electromagnetic radiation generated by the generator 1 to the reactive medium contained in said reactor 2.

The transmission device 3 comprises:
- a wave guide 4 positioned at the output of the generator 1 and coupled with the lossy transmission line 70 according to the invention, in order to transmit the generated electromagnetic energy to the reactive medium;
- coupling means 5 arranged so as to allow transfer of electromagnetic energy into the reactive medium from the wave guide 4; and
- adaptation means 8 designed in order to ensure adaptation of the electromagnetic energy to the reactive medium and to allow optimization of the energy transfer depending on the medium.

The adaptation means 8 comprise:
- a first mobile adaptation member 81 composed of a short-circuit piston comprising a metal plate, in copper or in aluminium for example, placed perpendicularly to the direction of propagation of the waves, said short-circuit piston 81 being positioned at the free end 49 of the wave guide 4 opposite to the generator 1, and therefore downstream from the reactor 2;
- and, depending on the cases, a second mobile adaptation member 82 composed of a variable coupling iris, positioned in the wave guide 4 between the generator 1 and the short-circuit piston 81, and more particularly upstream from the reactor 2.

The coupling means 5 comprise said lossy transmission line 70 and the means 6 for matching the impedance of the lossy transmission line 70/reactive medium assembly; these matching means 6 notably comprising the short-circuit piston 60 as described above. The coupling between the wave guide 4 and the lossy transmission line 70 may be of the same type as the one described above with reference to FIG. 9b.

The device also comprises a compartment 9 which insulates the electromagnetic radiation generator 1 from the reactor 2, notably for protecting persons and/or instruments external to said compartment 9 against any risk of explosion and/or fire which may occur at the electromagnetic radiating generator 1. The compartment 9 may further be inertized by filling it with a neutral gas such as for example argon, carbon dioxide or nitrogen, and be then sealably insulated in order to avoid neutral gas leaks. By inertization is meant the technique which includes replacing an atmosphere for example an explosive atmosphere, with a non-combustible and non-oxidizing gas or gas mixture.

This inertization technique may also be used for placing the wave guide 4, the coupling means 5 and the reactor under an atmosphere in the case of the treatment of a reactive medium comprising flammable, explosive substances or likely to produce such substances during treatment. For this, windows (not shown) may be positioned in the wave guide 4;

said windows including an insulating material transparent to waves such as for example quartz.

Figure 11B:
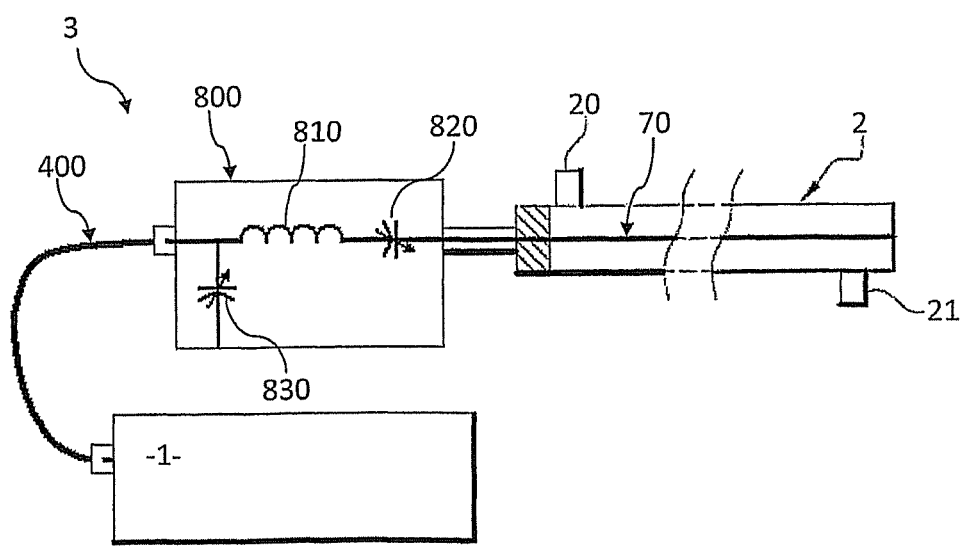

FIG. 11b schematically illustrates a device for electromagnetic treatment of a reactive medium by high frequency radiation according to the invention, which comprises:
- a high frequency radiation generator 1;
- a reactor 2 of the continuous type with an inlet 20 and an outlet 21 for said reactive medium; and
- a device 3 for transmitting the electromagnetic radiation generated by the generator 1 to the reactive medium contained in said reactor 2.

The transmission device 3 comprises:
- a coaxial transmission cable 400, of the 50 Ohm connection type, positioned at the outlet of the generator 1 and coupled with the lossy transmission line 70 according to the invention, in order to transmit the generated electromagnetic energy to the reactive medium;
- adaptation means 800 designed for ensuring adaptation of the electromagnetic energy to the lossy transmission line 70 and allowing optimization of the energy transfer depending on the medium.

The adaptation means 800 comprise an electric matching system placed in series on the coaxial transmission cable 400, said system being of a type known to one skilled in the art and for example comprising:
- a self-induction coil 810 (or inductor), a first variable capacitor 820 in series on the coaxial transmission cable 400, said first variable capacitor 820 correcting the reactive part of the impedance; and
- a second variable capacitor 830 in parallel with the coaxial cable 400, connected to one of the terminals of the cell 810 on the one hand and to a reference potential such as the ground on the other hand, second variable capacitor 830 correcting the resistive part of the impedance.

In order to couple the coaxial transmission cable 400 and the lossy transmission line 70, it is sufficient to electrically connect the first conductor 71 of the lossy transmission line 70 with a corresponding conductor of the transmission cable 400. The electric matching system 800 ensures impedance matching between the transmission cable 400 and the lossy transmission line 70/reactive medium assembly.

Figure 12:
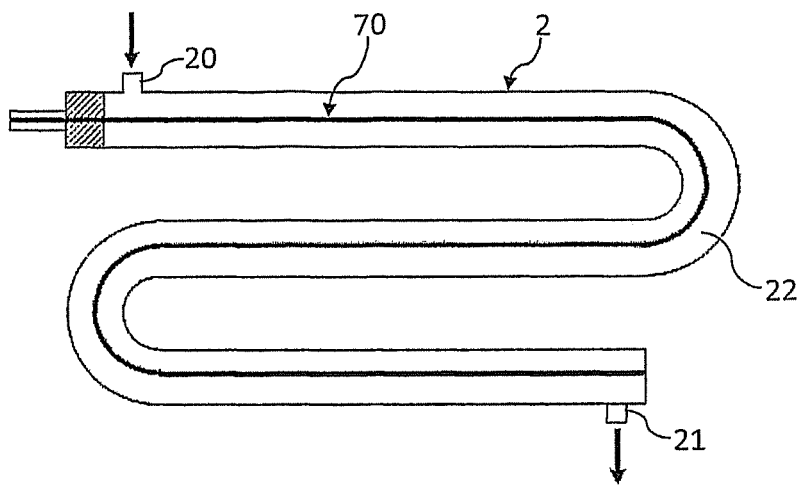
FIG. 12 is a schematic view of a continuous serpentine reactor with a serpentine lossy transmission line.

FIG. 12 illustrates a serpentine reactor 2, i.e. delimiting a cavity 22 with a general serpentine shape. The reactor 2 for example includes three rectilinear sections parallel with each other and successively connected through a 180° bend. The lossy transmission line 70 is also of a general serpentine shape and more particularly of a shape substantially identical with that of the cavity 22 in order to provide a coupling interface with the reactive medium all along the reactor 2, and thus apply electromagnetic energy. Of course, other reactor shapes 2 may be contemplated, the essential point being to note that a lossy transmission line 70 may be adapted to all reactor shapes 2, and is not only limited to rectilinear reactors.

Moreover, the reactor 2 and the lossy transmission line 70 will be all the longer since the reactive medium will not be very absorbent, such as for example oleaginous products. The length of the lossy transmission line 70 may also be adapted to the dwelling time in the reactor 2. The advantage of a serpentine configuration for the reactor 2 is make a long path available for the reactive medium while avoiding having a too long, therefore too cumbersome, rectilinear reactor. The length of the lossy transmission line 70 and also that of the reactor 2 may for example be comprised between a few centimeters and a few meters.

In every case, the metal walls of the reactor may include a jacket in which heat transfer, coolant or cryogenic fluids may circulate in order to obtain surface temperatures adapted to the needs of the contemplated treatments. The embodiments of the invention described hereafter illustrate the possibility of organizing more or less significant heat exchange surface areas between the reactive medium and the fluids circulating in the jacket. The fluids of the jacket may of course circulate in the same direction as the reactive medium or against this flow.

Figure 13A:
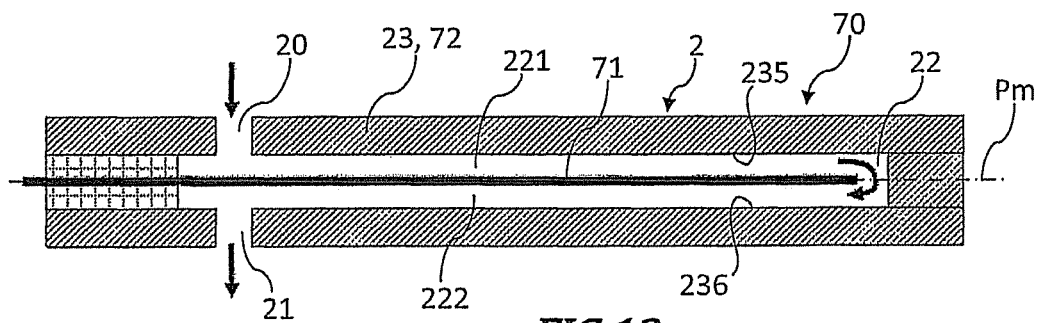
FIGS. 13a and 13b are longitudinal and cross-sectional views respectively of a flat continuous reactor with a lossy transmission line separating the interior of said reactor into an upper and lower circulation channel for the reactive medium.
Figure 13B:
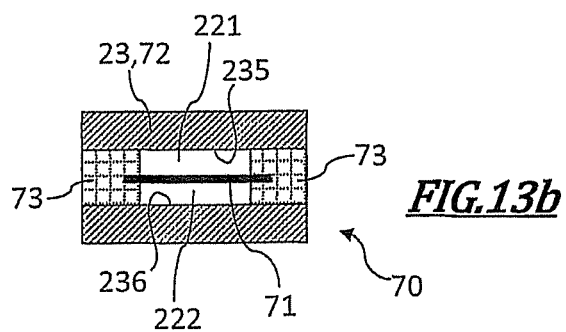

FIGS. 13a and 13b illustrate another embodiment of the lossy transmission line 70 extending inside a reactor 2 here with a parallelepipedal section. The first conductor 71 is exposed to the reactive medium in the reactor 2, inside the internal cavity 22 of the reactor 2. Inside the reactor 2, the second conductor 72 is formed with the external wall 23 of the reactor 2 (or reactor body); said external wall 23 being electrically coupled with the portion of the second conductor 72 external to the reactor 2.

The first conductor 71 of rectangular section extends over the whole width of the reactor 2 and its longitudinal edges are respectively encased in dielectric insulator strips 73; said dielectric insulator strips 73 thereby defining walls of the reactor 2.

In this configuration, the first conductor 71 divides the cavity 22 into two channels, the first 221 and the second 222 channel respectively, only in communication at the end of the line, corresponding here to the free end of the first conductor 71. The first channel 221 is also delimited by the first internal surface 235 of the wall 23, while the second channel 222 is also delimited by the second internal surface 236 of the wall 23 opposite to the first internal surface 235. The reactor 2 further has an inlet 20 and an outlet 21 for circulation of the reactive medium, wherein the inlet 20 opens out directly into the first channel 221 and the outlet 21 directly opens out into the second channel 222; the inlet 20 and the outlet 21 being advantageously positioned at the beginning of the line, for example symmetrically, relatively to the first conductor 71. Thus, the reactive medium enters the reactor 2 via the inlet 20, circulates in the first channel 221 where it is coupled with the first conductor 71, and then circulates in the second channel where it is again coupled with the first conductor 71 before exiting via the outlet 21.

It is noted that the channels 221 and 222 are of the same constant dimensions because the first conductor 71 is of constant thickness and extends in the middle plane Pm of the cavity 22 on the one hand and that both internal surfaces 235 and 236 are symmetrical relatively to the middle plane Pm and parallel to this middle plane Pm on the other hand.

Alternatively and in order to adjust the distribution profile of the electromagnetic fields, it is of course possible to act on the respective volumes of the channels 221 and 222, both channels 221 and 222 may be of distinct and variable dimensions notably by acting on:
- the geometry of the first conductor 71 which may vary along the line 70, notably its thickness which may vary asymmetrically relatively to the middle plane Pm of the cavity and/or its tilt relatively to the middle plane Pm of the cavity 22;
- the geometry of the external wall 23 which may vary along the line and more particularly the shape of both internal surfaces 235 and 236 which may no longer be symmetrical relatively to the middle plane Pm.

Figure 14:
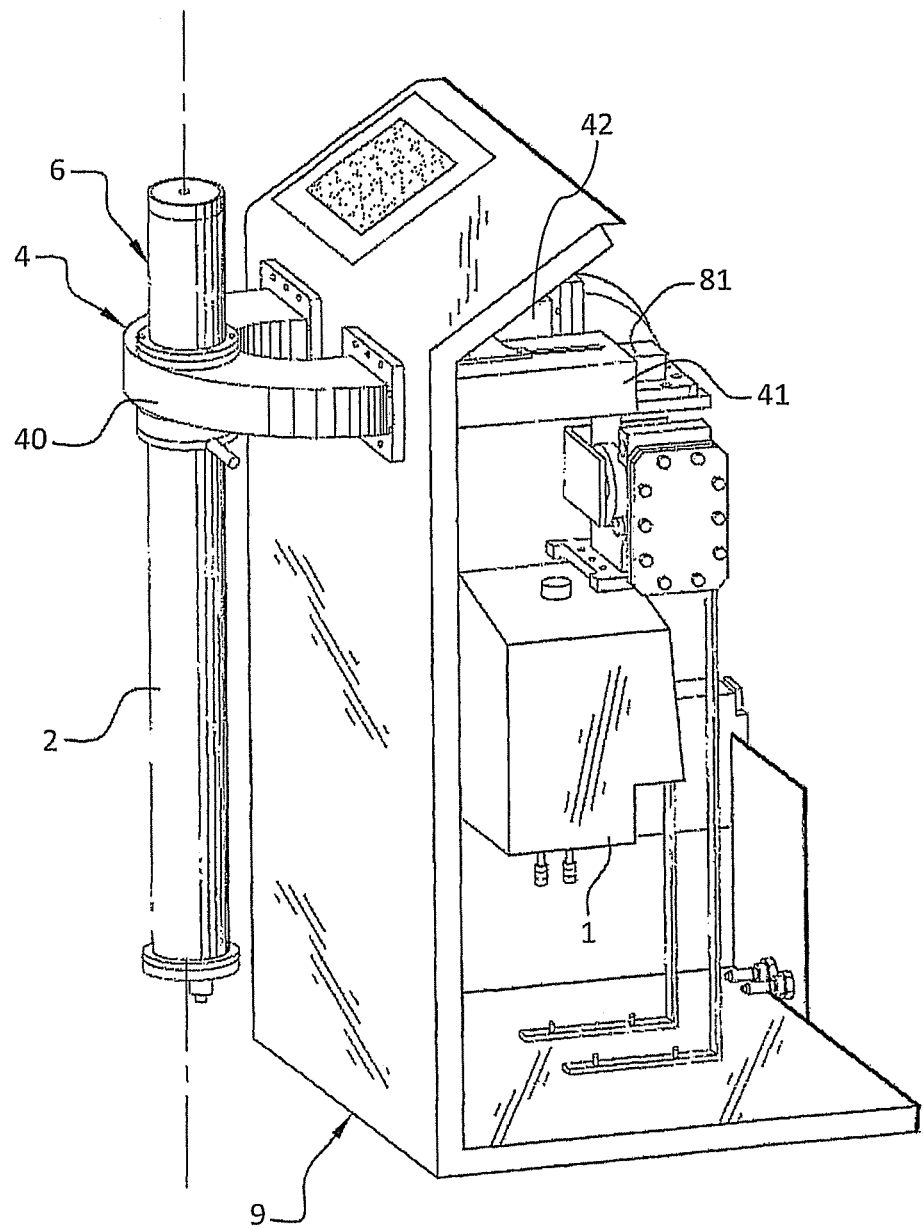
FIG. 14 is a perspective view of a microwave radiation treatment device according to the invention.

FIG. 14 illustrates a device according to the schematic illustration of FIG. 11a, where the radiation is of the microwave type. In this embodiment, the wave guide 4 includes a coupling section 40 with a curved shape, notably with the general shape of <<U>>, forming a return loop of said wave guide 4. The wave guide 4 further includes first 41 and second 42 rectilinear sections facing each other and respectively connected to first and second ends of said curved coupling section 40.

A first mobile adaptation member 81, such as a short-circuit piston, is translationally mobile in the first rectilinear section 41, and a second mobile adaptation member 82 (not illustrated) such as a variable coupling iris is translationally mobile in the second rectilinear section. The rectilinear sections 41, 42 are parallel and facing each other, so that both mobile adaptation members 81, 82 may be moved in synchronization by simple means, with a single motor and without any complex synchronization device.

It is noted that the reactor 2 is coupled to the curved section 40 of the wave guide 4, said curved coupling section 40 extending at least partly outside said compartment 9. Certain elements of the device are not described again, having already been the subject of a description referring to FIGS. 9b (for the adaptation and coupling means) and 11a.

Figure 15A:
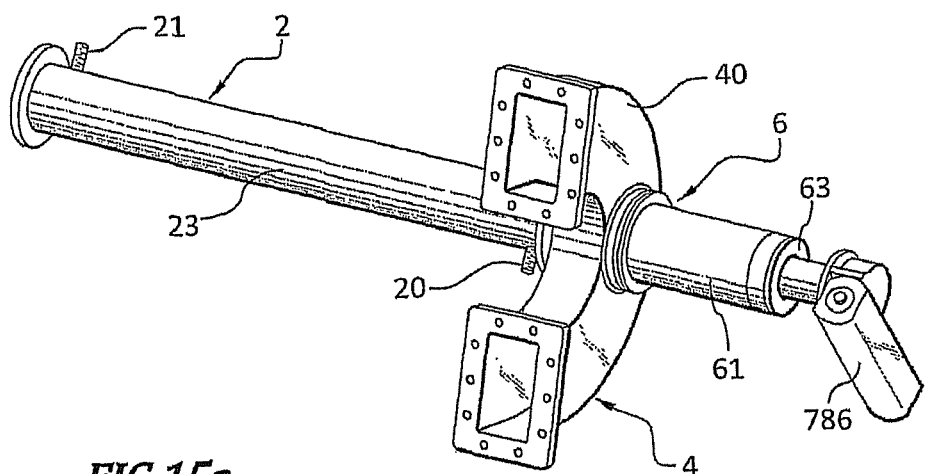
FIGS. 15b to 15c are different perspective views of continuous reactors coupled with a wave guide, adapted for a device according to the invention.
Figure 15B:
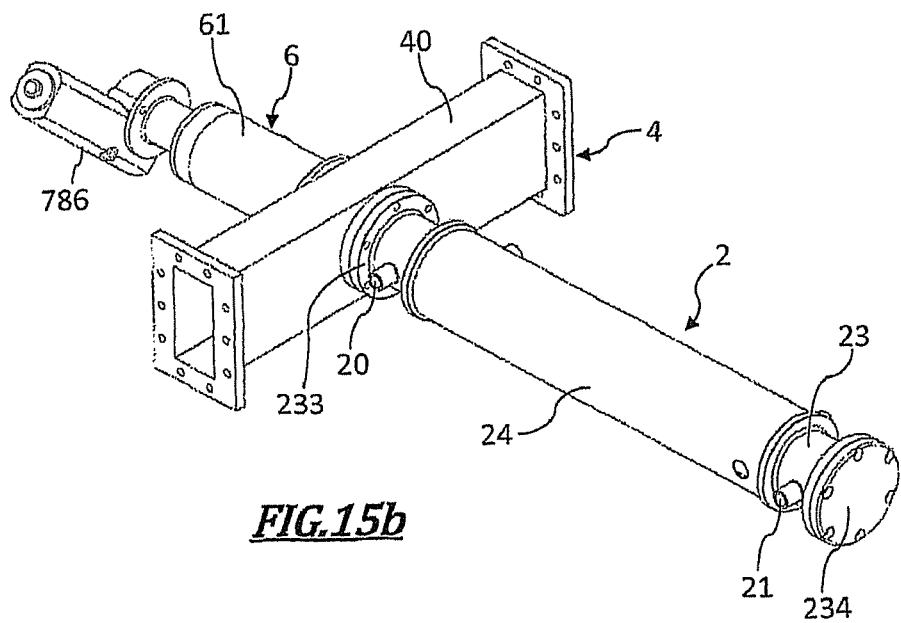
Figure 15C:
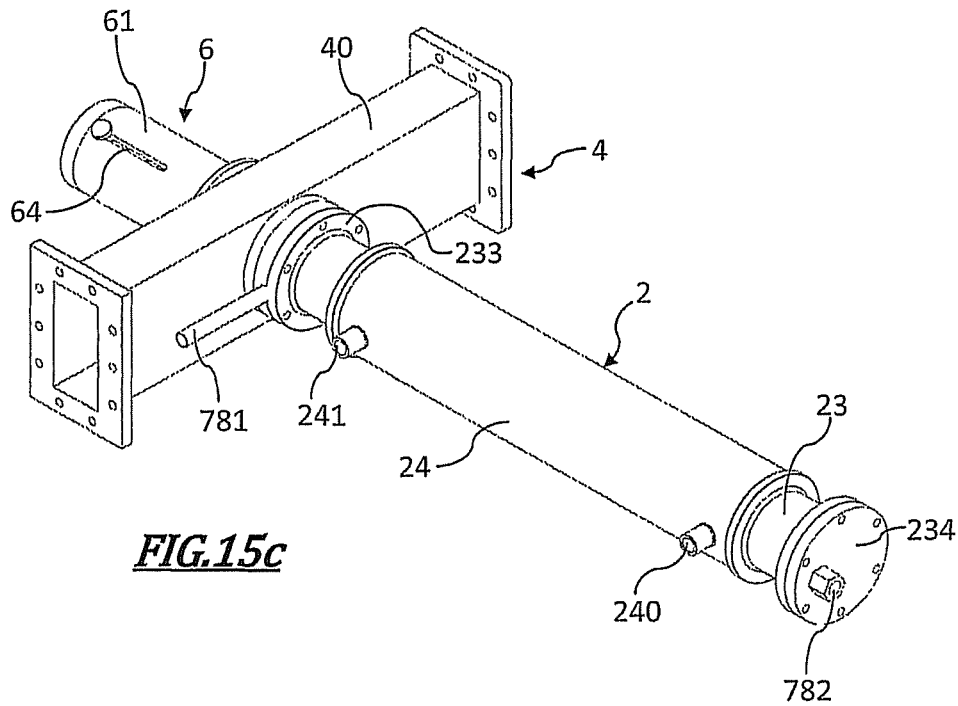
Figure 16:
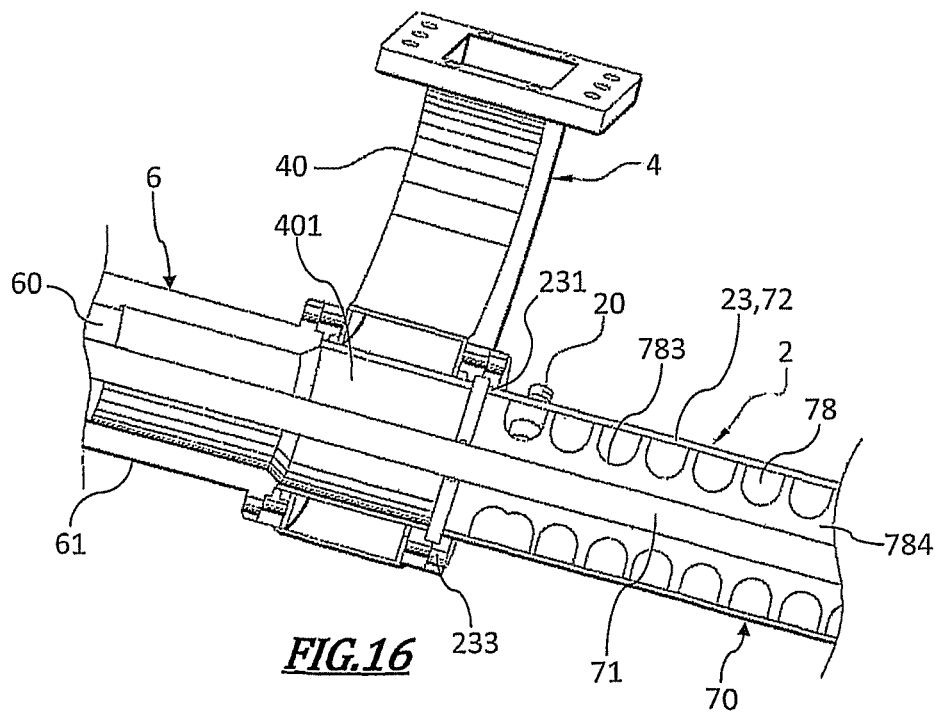
FIG. 16 is a partial longitudinal sectional view of a continuous reactor and a wave guide more particularly illustrating the coupling between the lossy transmission line according to the invention and the wave guide.

FIGS. 15 to 20 all illustrate a reactor 2 of the continuous type with an inlet 20 and an outlet 21 for circulation of the reactive medium. In FIGS. 15 to 20, are only illustrated the reactor 2 coupled with a coupling section 40 of the wave guide 4, the coupling section 40 which may be of the rectilinear type (FIGS. 15b and 15c) or curved as a <<U>> (FIGS. 15a and 16).

This reactor 2 comprises an external tubular wall 23 notably with a cylindrical section, which extends transversely to the wave guide 4 and which delimits an internal cavity 22, also with a cylindrical section, into which open out inlet 20 and outlet 21 orifices made in said external wall 23 for allowing reactive medium to circulate in this cavity 22 between both of these orifices 20, 21.

The external wall 23 has a first end 231 which is integrally added onto the coupling section 40 of the wave guide 4, for example by screwing or via an integrally added crown onto this first end 231 of the external wall 23. The lossy transmission line 70 crosses this first end 231 via a seal and insulation gasket 26.

The external wall 23 has a second end 232 closed by a lid 234.

Except for the embodiment illustrated in FIG. 15a, the reactor 2 comprises a jacket 24 of the same type as the one described above with reference to FIG. 9b. The tubular jacket 24 notably with a cylindrical section, surrounds a length portion of the external wall 23 of the reactor 2, located between the inlet 20 and the outlet 21.

Coupling between the lossy transmission line 70 and the wave guide 4 with a coupling cavity 401 is of the same type as the one described above with reference to FIG. 9b.

Also, the means 6 for matching the impedance of the lossy transmission line 70/reactive medium assembly, with notably those of the piston 60 and the sleeve 61, are also of the same type as the one described above with reference to FIG. 9b.

The external wall 23 of the reactor 2 forms the second conductor 72 of the lossy transmission line 70 in the embodiments illustrated in FIGS. 16 to 20; the first conductor 71 extending in the cavity 22 of the reactor 2, and the dielectric insulator 73 being positioned between the first conductor 71 and the second conductor 72, here the external wall 23 of the reactor 2; the dielectric insulator 73 may comprise a suitable material added onto the first conductor 71, or may comprise all or part of the reactive medium including at least one component sensitive to electromagnetic waves.

FIGS. 16 to 19 illustrate several embodiments wherein a reactive medium circulates in the reactor 2 within a circulation channel 78 surrounding the first conductor 71 of the lossy transmission line 70 on all or part of said line, said circulation channel being at least partly transparent to electromagnetic radiation. The circulation channel 78 provides the interface between the first conductor 71 and the reactive medium which circulates inside.

Figure 17:
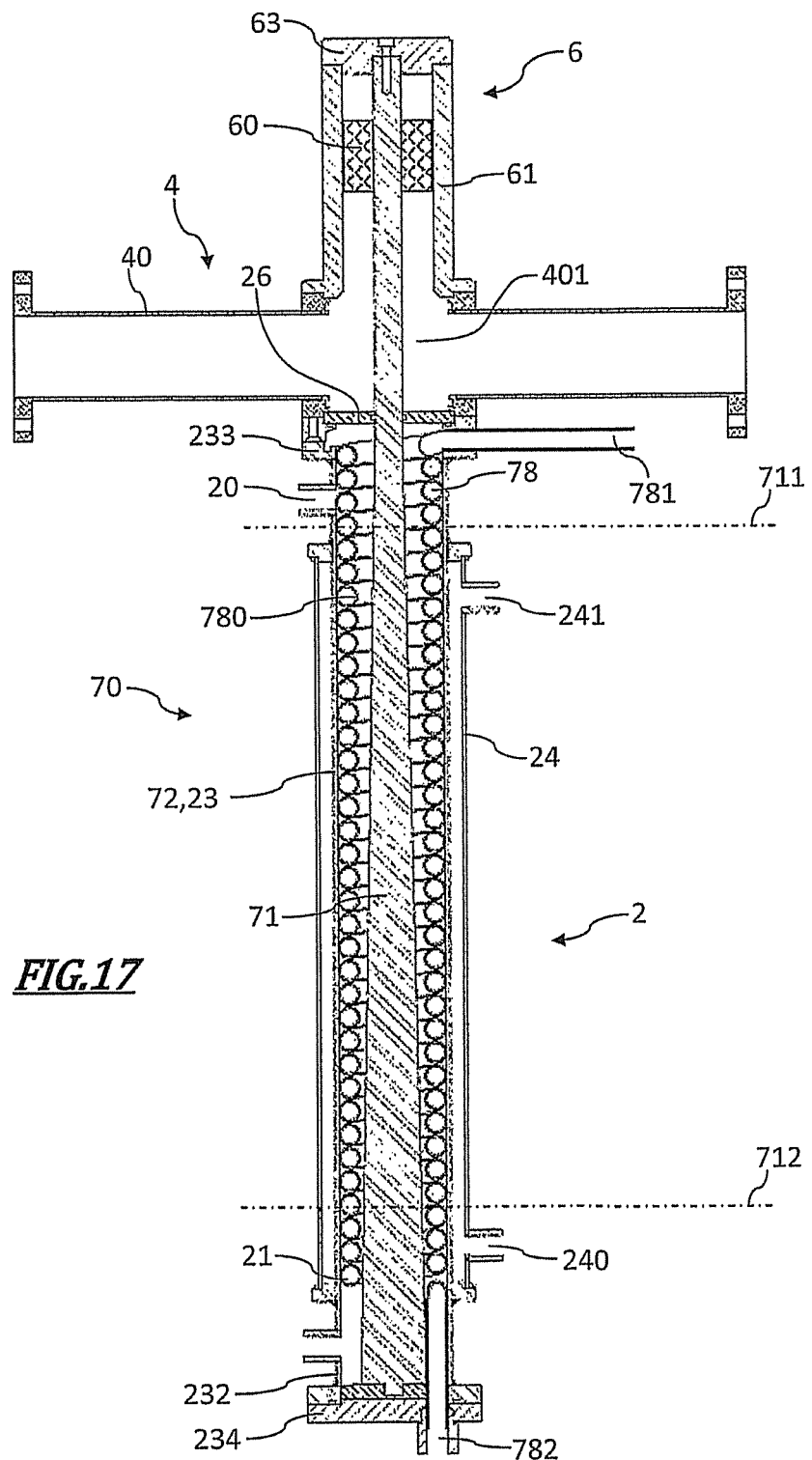
FIGS. 17 to 19 are longitudinal sectional views of reactors with application devices according to the invention.

In the embodiment illustrated in FIGS. 15c and 17, the circulation channel 78 includes a hollow tube 780 with a general spiral shape and which surrounds the first conductor 71 on part of its length. The hollow tube 78 thereby extends between the second conductor 72, here the external wall 23 of the reactor 2, and the first conductor 71. The hollow tube 780 is made in a material transparent to electromagnetic radiation.

A first end 781 of the hollow tube 780 exits the reactor 2 at the first end 231 of the external wall 23, and a second end 782 also exits the reactor 2 at the second end 232 of the external wall 23, notably crossing the lid 234.

It is noted that a reactive medium may be introduced into the reactor 2 via the hollow tube 780, and a neutral dielectric fluid (of the liquid or gas type) may be introduced into the reactor 2 via the inlet 20 and the outlet 21. In this way, said reactive medium circulates in the hollow tube 780 while the neutral dielectric fluid circulates in the reactor 2, between the first conductor 71, the second conductor 72 and said hollow tube 780, and may thus act as a dielectric insulator between the first conductor 71 and the reactive medium. It is thereby possible to act on the distribution of the profile of the electromagnetic field in order to modify the energy transfer between the first conductor 71 and the reactive medium circulating in the hollow tube 780. An important function of the neutral dielectric fluid is to promote thermal control of the reactive medium by avoiding the formation of hot points within the hollow tube 780, since the reactive medium is heat-controlled with more difficulty by the jacket 24 because it circulates in the hollow tube 780 and thus the heat exchange surface area is reduced.

In order to vary the transfer interface between the lossy transmission line 70 and the reactive medium circulating in the hollow tube 780, it is possible to act on the following two parameters either alone or as a combination:
  geometry of the first conductor 71;
  geometry of the hollow tube 780, in order to control the reactive medium surface area exposed to the radiation of the first conductor 71.

In order that the first conductor 71 provides an increasing radiating surface area per unit length, between the beginning and the end of the line, said first conductor 71 has a frusto-conical shape. Thus, the diameter increasing along the line, the radiating surface area of the first conductor 71 also increases per unit length.

The hollow tube 780 illustrated in FIG. 17 is of constant section (corresponding to the size of the tube), of constant diameter (corresponding to the diameter of the turn), and of constant pitch; the only control of the coupling interface between the lossy transmission line 70 and the reactive medium being carried out here by the frusto-conical shape of the first conductor 71.

However, in order that the reactive medium provides a surface area exposed to the radiation per unit length which increases between the beginning and the end of the line, it is possible to act on the geometry of the hollow tube 780 notably by providing the following variations, between the beginning and the end of the line:
  increase in the section, corresponding to an increasingly large tube; and/or
  reduction in the diameter, corresponding to a tube increasingly close to the first conductor 71; and/or reduction in the pitch, corresponding to increasingly closer turns, the turns of the beginning of the line have to be spaced apart.

Figure 18:
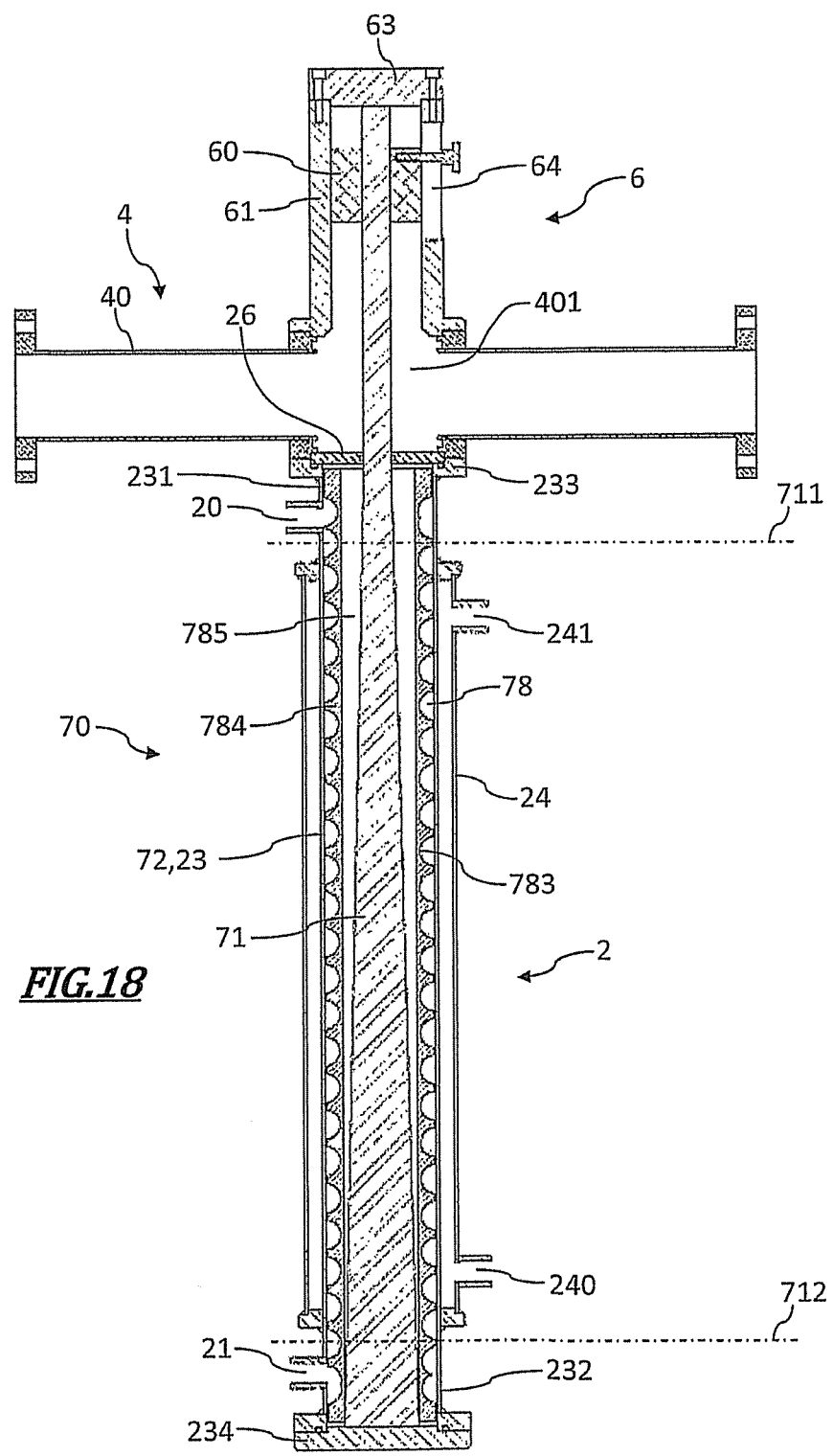
Figure 19:
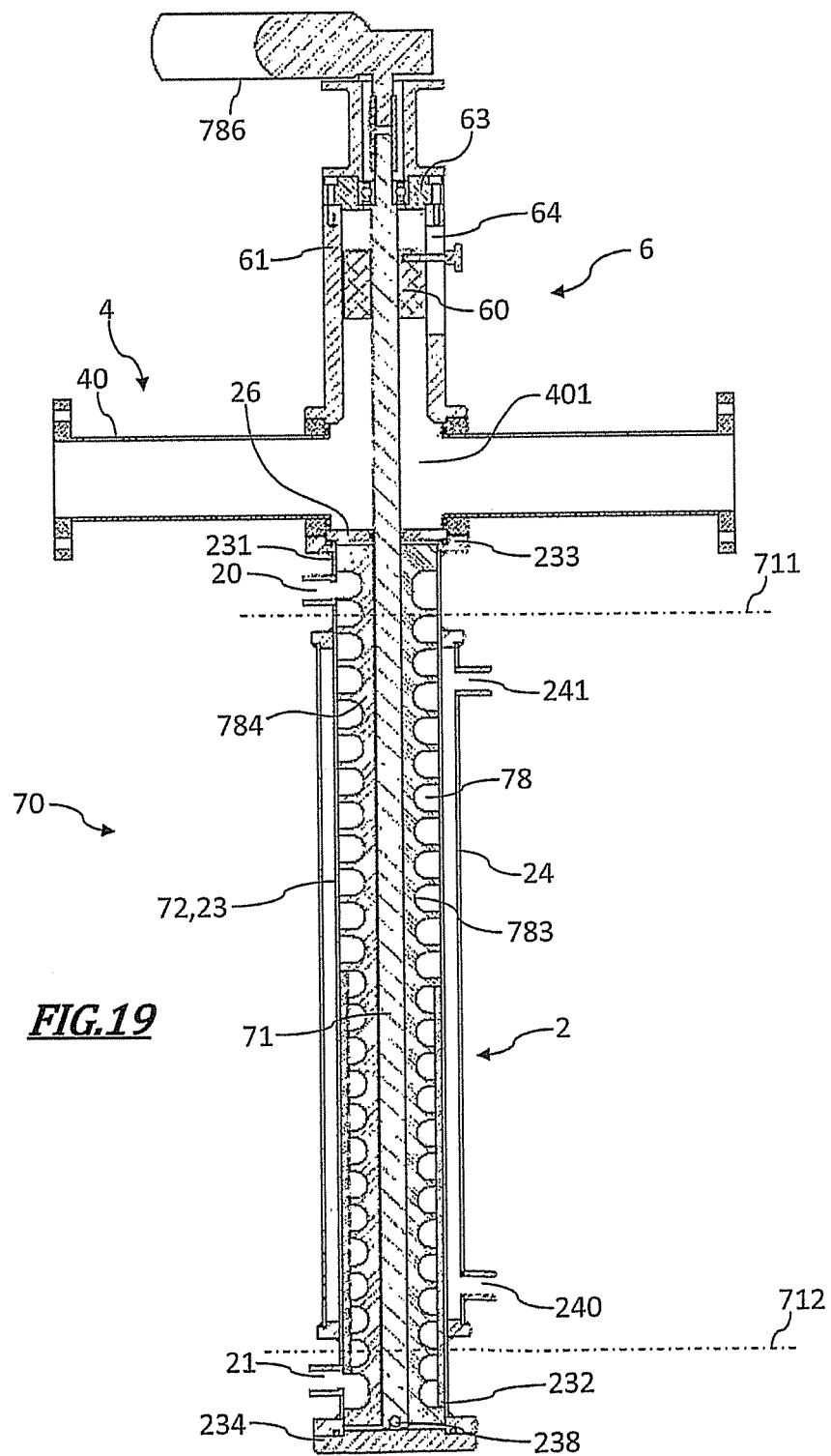

In the embodiment illustrated in FIGS. 16, 18 and 19, the circulation channel 78 is delimited by a spiral groove 783 on the one hand made on the external face of a hollow body 784 surrounding the first conductor 71, and by the external wall 23 on the other hand. The hollow body 784 is sealably mounted against the external wall 23, so that the reactive medium only circulates in the groove 783. The reactive medium is introduced into the groove 783 via the inlet 20, which directly opens out into the groove 783, and emerges therefrom via the outlet 21, which also directly opens out into the groove 783. The hollow body 784 is made in a material transparent to electromagnetic radiation, and may be considered as part of the insulator 73, in the same way as the sleeve 730 in dielectric material described hereinbefore notably with reference to FIGS. 9b and 9c.

In order to vary the transfer interface between the lossy transmission line 70 and the reactive medium circulating in the groove 783, it is possible to act on the two following parameters either alone or as a combination:
geometry of the first conductor 71;
geometry of the hollow body 784, and more particularly of the groove, in order to control the reactive medium surface area exposed to the radiation of the first conductor 71, which substantially amounts to the same as acting on the geometry of the sleeve 730 as illustrated in FIG. 9c.

As illustrated in FIG. 18, in order that the first conductor 71 provides an increasing radiating surface area per unit length, between the beginning and the end of the line, said first conductor 71 has a frusto-conical shape. In this embodiment, the hollow body 784 has an internal cavity 785 with a cylindrical section and the diameter of which is substantially greater than the diameter of the first conductor 71 at its free end. Of course, it is possible to act on the dielectric insulation between the first conductor 71 and the groove 783 by controlling the dimensions of the internal cavity 785 of the hollow body 784, so that said hollow body 784 more or less clasps said first conductor 71.

According to a particular feature, the hollow body 784 is rotationally mobile in order to be able to be driven into rotation in the reactor 2 around the longitudinal axis of the lossy transmission line 70; the hollow body 784 with its groove 783 thereby operating according to the principle of the worm screw in order to be able to convey a reactive medium between the inlet 20 and the outlet 21 of the reactor 2. Such conveying by rotation of the hollow body 784 is particularly suitable for a reactive medium in solid form, such as of the granular or powdery type for example.

As illustrated in FIG. 19, in order to drive the hollow body 784 into rotation, it is possible to make it interdependent in rotation with the hollow body 784 and the first conductor 71 and to drive into rotation said first conductor 71, for example by means of a rotary motor 786 mounted on the sleeve 61, and more particularly on its transverse end wall 63. In this case, the first conductor 71 crosses said transverse end wall 63, in which it is rotatably mounted, notably by means of a ball bearing, in order to cooperate with the rotary motor 786. At the other end of the first conductor 71, said first conductor 71 may be guided in rotation by means of a centering pin 238 protruding from the lid 234 in order to engage into a cavity made for this purpose in this end of the first conductor 71. Of course, it may be contemplated that the rotary motor 786 be positioned at this other end of the first conductor 71 which would then cross the lid 234 in the same way that it crosses the transverse end wall 63 in FIG. 19.

In order to make the hollow body 784 and the first conductor 71, for example of cylindrical section, interdependent in rotation, mounting without any play said hollow body 784 around said first conductor may be contemplated; the internal cavity 785 of the hollow body 784 is then completely filled with the first conductor 71.

The groove 783 illustrated in FIG. 18 is of constant width (corresponding to the dimension along the longitudinal axis of the first conductor 71), of constant depth (corresponding to the dimension along the axis perpendicular to the first conductor 71), and of constant pitch; the only control of the coupling interface between the lossy transmission line 70 and the reactive medium being carried out here by the frusto-conical shape of the first conductor 71.

However, in order that the reactive medium provides a surface area exposed to the radiation per unit length which increases between the beginning and the end of the line, it is possible to act on the geometry of the groove 783 notably by providing the following variations, between the beginning and the end of the line:
increase in the width of the groove, corresponding to an increasingly wide groove; and/or
increase in the depth of the groove, corresponding to a groove increasingly close to the first conductor 71; and/or
reduction in the pitch, corresponding to increasingly closer turns, the turns at the beginning of the grooves have to be spaced apart.

Figure 20A:
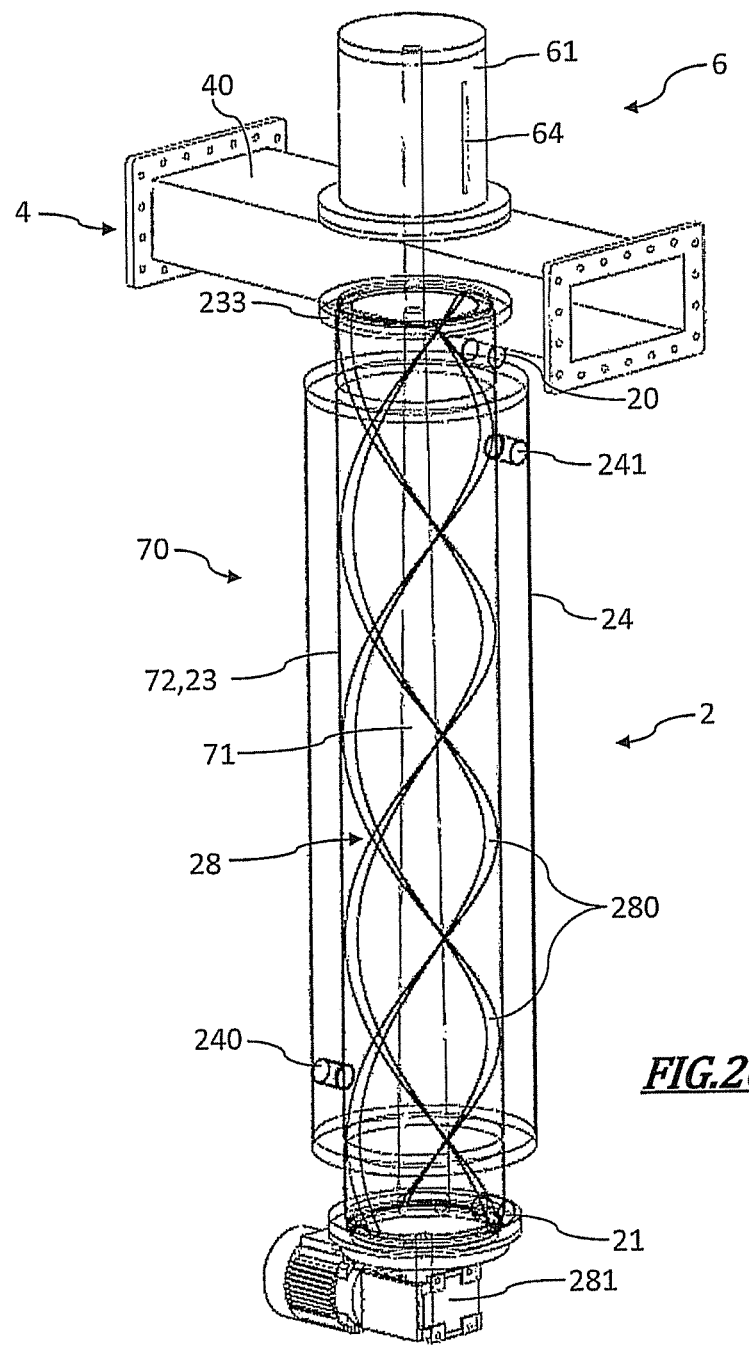
FIGS. 20a and 20b are perspective and longitudinal sectional views respectively of a continuous reactor with an application device according to the invention.
Figure 20B:
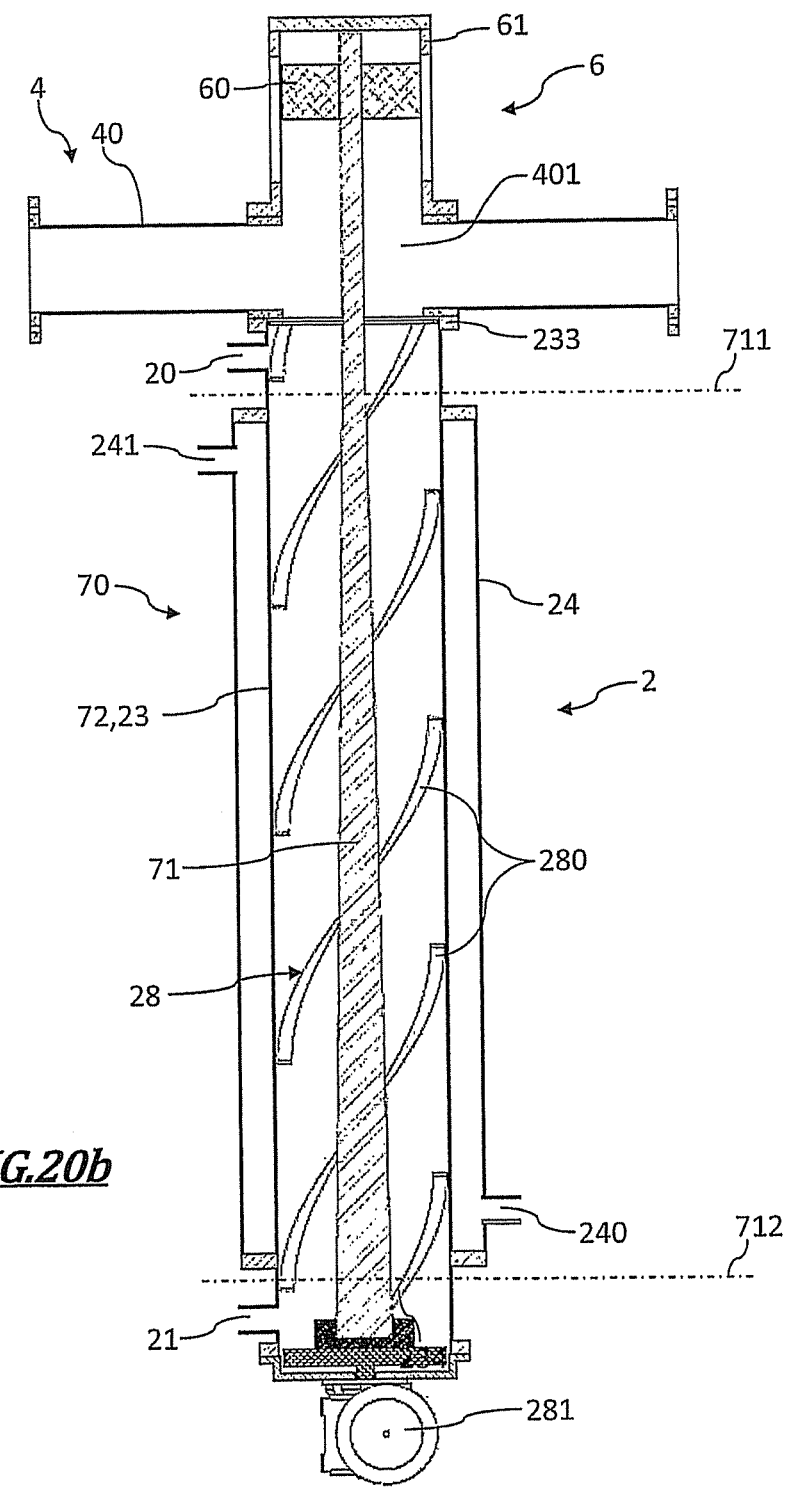
Figure 20C:
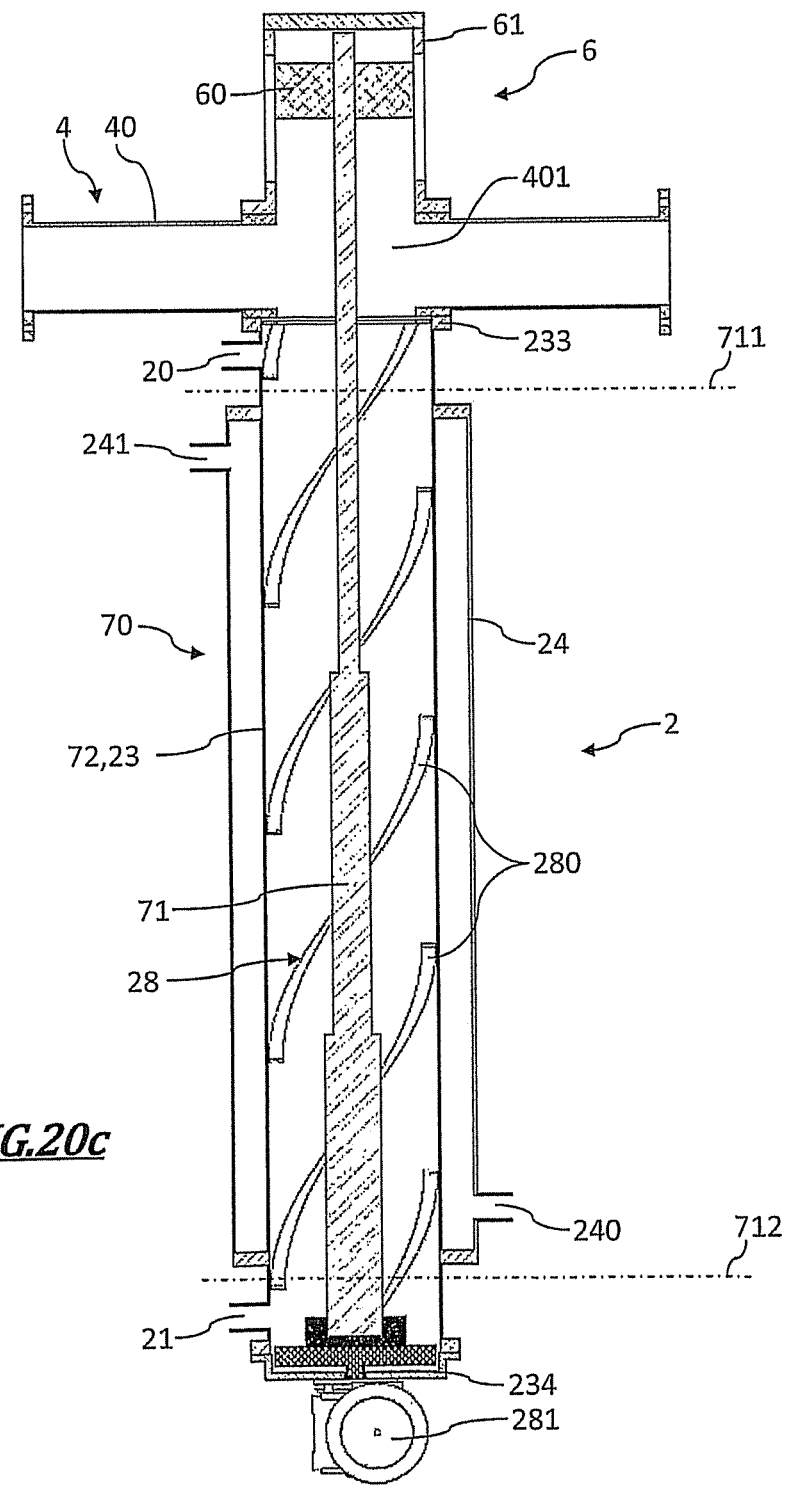
FIG. 20c is a view identical with that of FIG. 20a with an alternative embodiment of the lossy transmission line.

FIGS. 20a to 20c illustrate reactors 2 which comprise stirring means 28 as propellers 280 or helicoidal parts performing a rotary movement by means of a motorized member 281. According to a particular embodiment of the invention, the propellers or helicoidal parts 280 have a parallel axis of symmetry, or even coinciding with the longitudinal axis of the lossy transmission line 70. Thus, the propellers extend around the first conductor 71 of the lossy transmission line 70, and they are centered around this first conductor 71. The propellers 280 may also have an external diameter substantially equal to the internal diameter of the tubular reactor body 23 (or external wall 23), in order to rotate in said body 23 with small play relatively to the latter. The propellers 280 are driven into rotation notably by means of a rotary motor 281 positioned at the end 232 of the reactor 2, outside the latter.

The reactors 2 illustrated in FIGS. 20a to 20c do not comprise any circulation channel for a reactive medium as described above; said reactive medium being introduced at the inlet 20 and extracted at the outlet 21, this reactive medium extending completely between the first conductor 71 and the second conductor 72, i.e. the external wall 23 or reactor body.

In order to vary the transfer interface between the lossy transmission line 70 and the reactive medium circulating in the reactor 2, it is possible to only act on the transverse geometry of the first conductor 71: in FIGS. 20a and 20b, the first conductor 71 has a general frusto-conical shape, with continuous increase in the section of the first conductor 71, and in FIG. 20c, the first conductor 71 has a general staircase shape, with stepwise increase in the section of the first conductor 71.

In each of the FIG. 17, 18, 19, 20b or 20c, first 711 and second 712 cross-sections of the lossy transmission line 70 are illustrated, wherein the transfer interface between said lossy transmission line 70 and the reactive medium, and therefore the coupling between said line 70 and said reactive medium are larger in the case of the second cross-section 712 as compared with the first cross-section 711. The different means for obtaining this difference in transfer interface or coupling with the reactive medium have been described above and mainly comprise acting on the geometry of the first conductor 71 and/or of the circulation channel 78 and/or of the second conductor 72 and/or of the insulator 73.

Of course, the exemplary embodiment mentioned above does not have any limitation and other details and improvements may be provided to the application device according to the invention, without however departing from the scope of the invention wherein other first conductor and/or circulation channel and/or reactor and/or second conductor and/or insulator embodiments may be achieved.

The invention claimed is:

1. A device for applying electromagnetic energy to a reactive medium, said device configured to be coupled with an electromagnetic radiation generator via means for transmitting said radiation, comprising at least one lossy transmission line having an interface for transferring electromagnetic energy to the reactive medium, said transfer interface being arranged so as to ensure along said line a predetermined distribution profile of the electromagnetic energy density delivered to said medium through said line, wherein the lossy transmission line comprises at least one first electric conductor and one second electric conductor insulated at least partly from each other by means of an insulator having suitable dielectric characteristics, the first conductor configured to be coupled with the generator on a first side and with the reactive medium on a second side to allow the generated electromagnetic energy to be applied to said reactive medium according to the predetermined distribution profile of the electromagnetic energy density, and wherein the second conductor is configured to extend into the interior of a reactor wherein said reactive medium is positioned,
wherein the lossy transmission line has three distinct portions:
a first portion configured for coupling with the generator, wherein the first conductor is exposed and not surrounded by the second conductor and by the insulator;
a second connecting portion adjacent thereto;
a third portion for applying electromagnetic energy to the reactive medium, said third portion extending inside the reactor and being arranged so that the reactive medium is positioned between the first conductor and the second conductor and the insulator at least partly includes the reactive medium.

2. The application device according to claim 1, wherein the transfer interface of the transmission line is distinct between at least one first and one second cross-section of said line, electromagnetic energy being delivered to the medium at each of these cross-sections.

3. The application device according to claim 2, wherein the transfer interface of the lossy transmission line varies continuously, notably regularly, or discontinuously, notably stepwise, between the first cross-section and the second cross-section, with notably a variable transverse geometry over the whole length of the line.

4. The application device according to claim 1, wherein the lossy transmission line is arranged so that the reactive medium is positioned
either around said second conductor, the insulator comprising a suitable dielectric material;
or at least partly between the first and the second conductor, the insulator at least partly comprising the reactive medium.

5. The application device according to claim 1, wherein the second conductor has variable transverse geometry along the lossy transmission line and/or the first conductor has variable transverse geometry along the lossy transmission line and/or the insulator includes a sleeve in a dielectric material surrounding said first conductor, said sleeve being of variable transverse geometry, in order to obtain a variable transfer interface between the first conductor and the reactive medium.

6. The application device according to claim 1, further comprising at least one circulation channel for the reactive medium surrounding the first conductor of said lossy transmission line on all or part of said line, said circulation channel being at least partly transparent to electromagnetic radiation.

7. The application device according to claim 6, wherein the circulation channel either comprises at least one hollow tube with a general spiral shape, or is partly delimited by a spiral groove made on the external face of a hollow body surrounding the first conductor, a geometry of the circulation channel being preferably such that:
a pitch of said hollow tube or of said groove varies along the lossy transmission line notably in a direction of a reduction in the pitch towards an end of the line, and/or
a diameter of said hollow tube or a depth of the groove varies along said line, notably in a direction of a reduction in said diameter or in said depth towards the end of the line, and/or
a section of said hollow tube or a width of the groove varies along said line, notably in a direction of an increase in said section towards the end of the line.

8. An assembly comprising a device for applying electromagnetic energy to a reactive medium according to claim 1 and a reactor inside which said reactive medium is positioned, wherein said device for applying electromagnetic energy extend at least partly into an interior of said reactor.

9. The assembly according to claim 8, further comprising means for stirring said reactive medium inside said reactor, of the type comprising at least one propeller positioned in said reactor and rotationally mobile.

10. The assembly according to claim 8, further comprising means for controlling a temperature of said medium, formed with a jacket at least partly surrounding said reactor and in an interior of which a cooling or heating fluid circulates.

11. The assembly according to claim 8, further comprising means for pressurizing said cavity.

12. A device for treating by electromagnetic radiation a reactive medium comprising:
an electromagnetic radiation generator,
means for transmitting said electromagnetic radiation,
an assembly according to claim 8, wherein the application device is coupled with said generator via said transmission means, and
means for matching the impedances between the generator, the transmission means and the application device.

13. The device according to claim 12, wherein the electromagnetic radiation is of a microwave type and the transmission means comprise a wave guide, wherein the wave guide is in communication with a coupling cavity into an interior of which the first conductor of the lossy transmission line extends in order to allow coupling between said first conductor and said wave guide, and the device further comprising a hollow sleeve delimiting a space inside which a short-circuit piston is translationally mobile, said space being contiguous with said coupling cavity, said short-circuit piston sliding around an end of the first conductor opposite to the reactor, wherein the adaptation means comprise a first adaptation member translationally mobile in the wave guide and a second adaptation member also translationally mobile in the wave guide and wherein the first and the second adaptation members are positioned in the wave guide on either side of said reactor.

14. The device according to claim 12, wherein the electromagnetic radiation is of the high frequency type and the transmission means comprise a transmission cable, notably of the coaxial cable type, and wherein the adaptation means comprise an electric matching system placed in series on said transmission cable.

15. The device according to claim 12, wherein said device forms a device for heat treatment of a reactive medium in order to produce given chemical reactions by applying electromagnetic energy according to a distribution profile of the electromagnetic energy density along the lossy transmission line, said profile being selected depending on desired chemical reactions.

* * * * *